US006997832B2

(12) United States Patent
Onogi

(10) Patent No.: US 6,997,832 B2
(45) Date of Patent: Feb. 14, 2006

(54) VARIABLE-SPEED CONTROL SYSTEM FOR A TRANSMISSION

(75) Inventor: Kenkichi Onogi, Tokyo (JP)

(73) Assignee: Tokyo Automatic Machinery Co., Ltd., Tokyo (JP)

( * ) Notice: Subject to any disclaimer, the term of this patent is extended or adjusted under 35 U.S.C. 154(b) by 0 days.

(21) Appl. No.: 10/758,263

(22) Filed: Jan. 16, 2004

(65) Prior Publication Data

US 2004/0152547 A1 Aug. 5, 2004

Related U.S. Application Data

(62) Division of application No. 10/004,881, filed on Dec. 7, 2001, now Pat. No. 6,764,421.

(30) Foreign Application Priority Data

May 10, 2001 (JP) ............................ 2001-180874
Sep. 29, 2001 (JP) ............................ 2001-338757

(51) Int. Cl.
*F16H 61/00* (2006.01)

(52) U.S. Cl. ............................................ 474/8; 474/46

(58) Field of Classification Search .................... 474/8, 474/17, 18, 20, 39, 46
See application file for complete search history.

(56) References Cited

U.S. PATENT DOCUMENTS 2,185,411 A 1/1940 Lewellen et al.
2,709,374 A 5/1955 Williams
3,949,621 A 4/1976 Beusink et al.
4,364,735 A 12/1982 Plamper et al.
4,475,893 A 10/1984 Anno et al.
4,493,681 A 1/1985 Takano
4,735,598 A 4/1988 Moroto et al.
4,973,288 A 11/1990 Sakakibara et al.
5,052,990 A * 10/1991 Sakakibara et al. ......... 475/210

(Continued)

FOREIGN PATENT DOCUMENTS

EP 0 293 487 12/1988

*Primary Examiner*—Vicky A. Johnson
(74) *Attorney, Agent, or Firm*—Rothwell Figg Ernst & Manbeck

(57) ABSTRACT

In a constant horse-power type continuously variable transmission, a pressing force supply path using for a rotation-speed control is supplied to one of an input pulley d an output pulley, and an elastic force supply path using for an axial torque control to the then. However, the one pulley is applied only the pressing force as a control element, although the torque of the other pulley can be regulated by the elastic force, so that the frictional force applied to said one pulley cannot be positively regulated, and consequently, axial torque controls of an input shaft and an output shaft cannot be achieved sufficiently. This effect causes the transmission efficiency to deteriorate at both end ranges of a variable speed range. In the present invention, a variable-speed control system for a transmission makes axial torque controls of both the input and output pulleys compensate and hold a low-speed range and/or a high-speed range into a higher transmission efficiency, while cooperating with the semi-elastic force to the one pulley, of which elastic vibration is suppressed by the pressing force thereto to half, and the elastic force to the other pulley. By this way, a band width of an entire transmittable speed range is substantially enlarged.

41 Claims, 12 Drawing Sheets

U.S. PATENT DOCUMENTS

| | | | | |
|---|---|---|---|---|
| 5,094,652 | A | 3/1992 | Sakakibara et al. | |
| 5,180,339 | A | 1/1993 | Haley et al. | |
| 5,269,726 | A | 12/1993 | Swanson et al. | |
| 5,361,744 | A | 11/1994 | Teraoka | |
| 5,676,612 | A | 10/1997 | Schellekens | |
| 6,120,400 | A | 9/2000 | Onogi | |
| 6,219,608 | B1 | 4/2001 | Abo et al. | |
| 6,243,638 | B1 | 6/2001 | Abo et al. | |
| 6,383,102 | B1 * | 5/2002 | Onogi | 474/46 |
| 6,494,798 | B1 * | 12/2002 | Onogi | 474/28 |
| 6,669,589 | B1 * | 12/2003 | Onogi | 474/69 |
| 6,764,421 | B1 * | 7/2004 | Onogi | 474/46 |

* cited by examiner 3
2
Contact Angle θ0
Speed Ratio ε0
r0
r1
rmin

Instrution Supply
θb
rmin
3
2

θc
rmin
3
2 rmin
θd
Fs
Ft
3
2

θ1
r0
r1
3
2
Speed Ratio ε1
Belt Skip Motion 2a
2b
2
3
3'
r1
r0

VARIABLE-SPEED CONTROL SYSTEM FOR A TRANSMISSION

CROSS-REFERENCE TO RELATED APPLICATIONS

This application is a divisional application of application Ser. No. 10/004,881 filed Dec. 7, 2001 now U.S. Pat. No. 6,764,421, the disclosure of which is incorporated herein by reference in its entirety.

BACKGROUND OF THE INVENTION

The present invention relates to a pulley pressure control system for a transmission which controls a pressing force and an elastic force applied to a pulley to stabilize torque and achieve high efficient transmission, which is applicable to general industrial machines, vehicles, electric motors and the like.

A constant horse power transmission is known from U.S. Pat. Nos. 4,973,288 and 5,269,726; the former discloses a hydraulic type and the latter a screw pressurizing type. The inventive concepts of both the patents have a principal defect. FIGS. 1(A) to 1(F) are views of assistance in explaining the principle of transmission in a belt type transmission. The figures show in the order of (A) to (E) change-over-time of a belt 3 on a secondary pulley 2 when a primary pulley 1 supplies a speed reducing instruction to the secondary pulley 2. When a constant speed ratio shifts from $\epsilon_0$ to $\epsilon_1$, the contact radius of the belt 3 keeps a concentric circle; however, the belt 3 generates a skip motion at a final stage as shown the two figures (D) and (E). More specifically, at this time, a gap 3' is created between the belt and the pulley, with the result of which the application of pressure is instantaneously stopped as shown in FIG. 1(F). The quality of stable transmission in the belt type transmission depends on whether or not appropriate frictional force can be automatically recovered momentarily after the skip motion. In addition, also the quality of quick responsibility depends on the same. The belt type transmissions proposed by the above patents disclose cam compensation; however, the cam is recovered due to the release of pressure upon the skip motion, resulting in inappropriate operation. On the other hand, even if the transmission is artificially controlled only by a pressing force with the use of an automatic control system that involves a time delay inherently, it is realistically impossible to recover the appropriate frictional force momentarily, so that the quick responsibility will not be attained.

The present applicant has proposed in U.S. Pat. No. 6,120,400 frictional force control with the use of an elastic body and the division of roles of pulley function. The pulley function includes a reference pulley function and a follower pulley function by discriminating a pressing force and an elastic force respectively. To be more specific, the reference pulley function implements a rotation speed control and positioning a belt with the pressing force. The follower pulley function implements a torque control by application of frictional force of the elastic force. However, there remain some outstanding problems. First, although the follower function side is able to control the elastic force, the reference pulley function side has only the pressure as a control element, so that the frictional force supplied to the reference pulley function side cannot be positively controlled. Consequently, a shaft torque control cannot be performed sufficiently. On the other hand, the follower pulley side does not include the rotation speed control element, which leads to the same problem. Second, transmission efficiency deteriorates at both end ranges of a speed change range. That is, the transmission efficiency can not be averaged over the entire speed change range, which leads to narrowing an actual speed change range. Since transmission capacity of the belt type transmission will be determined by the product (N×T) of a rotation speed N and torque T for each pulley, the first problem is essentially the same as second problem. Accordingly, it is possible to solve the second problem if the first problem can be solved. More specifically, the control elements of the rotation speed and the shaft torque are configured to be independently adjustable for each pulley. In other words, a regulating function is divided into a function for regulating the rotation speed and a function for regulating the torque. This achieves high accuracy and high efficiency in the transmission.

SUMMARY OF THE INVENTION

Accordingly, it is a general object of the present invention to provide a pulley pressure control system for a transmission, in which a pressing force and/or an elastic force are individually arbitrarily regulated from outside for each pulley and applied to the same, and a pulley role function (function by role) and a control factor regulating function (function by element) are separately controlled.

A first object of the present invention is to provide a pulley pressure control system capable of independently selecting and applying a pressing force and/or an elastic force to a single pulley, and externally regulating the pressure and/or elastic force to arbitrary values independently.

A second object of the present invention is to provide a pulley pressure control system capable of applying an elastic force to a pulley having a follower pulley function based on a rotation speed element relating to the speed change displacement of a movable disk and a torque element relating to the compressive displacement of an elastic body, both the elements being adjustable independently.

A third object of the present invention is to provide a pulley pressure control system capable of independently applying a pressing force, an elastic force and a semi-elastic force, to a single pulley, the elastic vibration of which is restrained by the simultaneous supply of the pressing force and the elastic force to the pulley.

A fourth object of the present invention is to provide a pulley pressure control system in which a channel of a pressing force is different from a channel of an elastic force each led to a single pulley, and switching instructions between pulley role functions to the channels are provided so as to achieve a role function and an element-by-element function.

A fifth object of the present invention is to provide a pulley pressure control system capable of simultaneously applying a pressing force and a semi-elastic force, the elastic vibration of which is substantially restrained by the pressing force, to a pulley having a reference pulley function, and giving the pulley a frictional force regulating function with high efficiency and high accuracy so as to eliminate a slip and braking during transmitting operation.

A sixth object of the present invention is to provide a pulley pressure control system capable of controlling, by a single control unit, a regulating function by control element relating to a rotation speed and torque, and a switching function of pulley roles relating to a reference pulley and a follower pulley.

A seventh object of the present invention is to provide a pulley pressure control system capable of performing a function by element and a function by role for compensating an error such as various kinds of deformation and deterioration in transmitting members and transmission ability such as efficiency, and speed-change regulation and torque regulation, based on four control elements including a rotation speed and torque by using pressure application devices each disposed for a pulley of a transmission.

An eighth object of the present invention is to provide a pulley pressure control system capable of synchronously switching between two pulley role functions at an arbitrary point of time whatever a transmission is in operation or in halt, or operation is performed artificially or automatically, selectively controlling optimum transmission ability, and, in particular, realizing an inexpensive system with high efficiency irrespective of whether a transmission is of a press-belt type or pull-belt type.

A ninth solving means according to the present invention is to provide a pressure control system composed by assembly with two types of pressure application devices whereby a pressing force and a elastic force and wishably applied to a movable disk of a singular pulley.

A tenth solving means according to the present invention is to provide a pressure control system preceding one of a pressing force and an elastic force to give one of input and output pulleys and simultaneously the other of the forces to give the other pulley so as to be capable of switching the role of each pulley function.

A eleventh solving means according to the present invention is to provide a pressure control system externally controlling axial torque on both sides of input and output pulley shafts by way of regulating separately each friction forces to the pulleys using the control means.

A twelfth solving means according to the present invention is to provide a pressure control system externally controlling a rotating speed of a output pulley using the control means in a manner that one of the pressing forces in input and output pulleys is preceded as an actual state and the other to be treated as a reserved state.

A general solving means according to the present invention is to provide a pulley pressure control system for a transmission in which a pressing force supply path and an elastic force supply path are disposed with each other, which pressing force supply path is directly led to a pulley through one of two pressing ends of compressing devices and which elastic force supply path is indirectly led to the pulley through the other of the two pressing ends and an elastic body, and elements of a rotation speed and torque are switched between and then individually regulated.

A first solving means according to the present invention is to provide a pulley pressure control system in which a pressing force supply path for a pressing force and an elastic force supply path for an elastic force are disposed with each other for an input pulley or an output pulley, an instruction is issued through either one of or both the pressing rce supply path and the elastic force supply path to regulate the pressing force and/or the elastic force to zero or an arbitrary value for selecting a type of pressure.

A second solving means according to the present invention is to provide a pulley pressure control system in which a movable disk and an elastic device are independently regulated by a compound compressing device having an superposing pressing end that receives both amounts of displacement of two pressing devices and a non-superposing pressing end that receives a non-superposed amount of displacement of the two pressing devices.

A third solving means according to the present invention is to provide a pulley pressure control system in which a pressing force supply path for a pressing force and an elastic force supply path for an elastic force are disposed in parallel with each other for a movable disk, and the pressing force, the elastic force, and a semi-elastic force are individually applied to the movable disk through the pressing force supply path or the elastic force supply path by means of an engagement device that interrupts transmission of one of the pressing force and the elastic force.

A fourth solving means according to the present invention is to provide a pulley pressure control system in which a function by element and a function by role are individually controlled by supplying an instruction to switch between pulley role functions through a pressing force instruction supply path and an elastic force instruction supply path.

A fifth solving means according to the present invention is to provide a pulley pressure control system in which pressure is simultaneously transmitted to a movable disk through both a pressing force supply path and an elastic force supply path disposed in parallel with each other, whereby a semi-elastic force is controlled by a control unit over an entire or a partial speed-change area.

A sixth solving means according to the present invention is to provide a pulley pressure control system in which a control unit that performs a regulating function by element, that is, a rotation speed and torque, supplies to a pulley a switching instruction of function by role, that is, a reference pulley and a follower pulley, whereby the pulley performs the reference pulley and the follower pulley distinguishably.

A seventh solving means according to the present invention is to provide a pulley pressure control system in which a pressure application device is provided for respective pulleys of a transmission, instructions are supplied through four driving sources and four instruction supply paths to the pressure application devices synchronously or asynchronously to compensate a driving pulley and a driven pulley independently for various factors to be regulated in addition to speed-controlling and torque-controlling, and thereby artificially creating an optimum transmission state.

An eighth solving means according to the present invention is to provide a pulley pressure control system in which a function switching instruction is issued through an instruction supply path of each pressure application device to synchronously switch between operation modes of a forward mode transmission and a reverse mode transmissions, based on a position of a belt at an arbitrary speed ratio, a rotation speed or the like.

DETAILED DESCRIPTION OF THE INVENTION

Figures 1A, 1B, 1C, 1D, 1E, 1F:
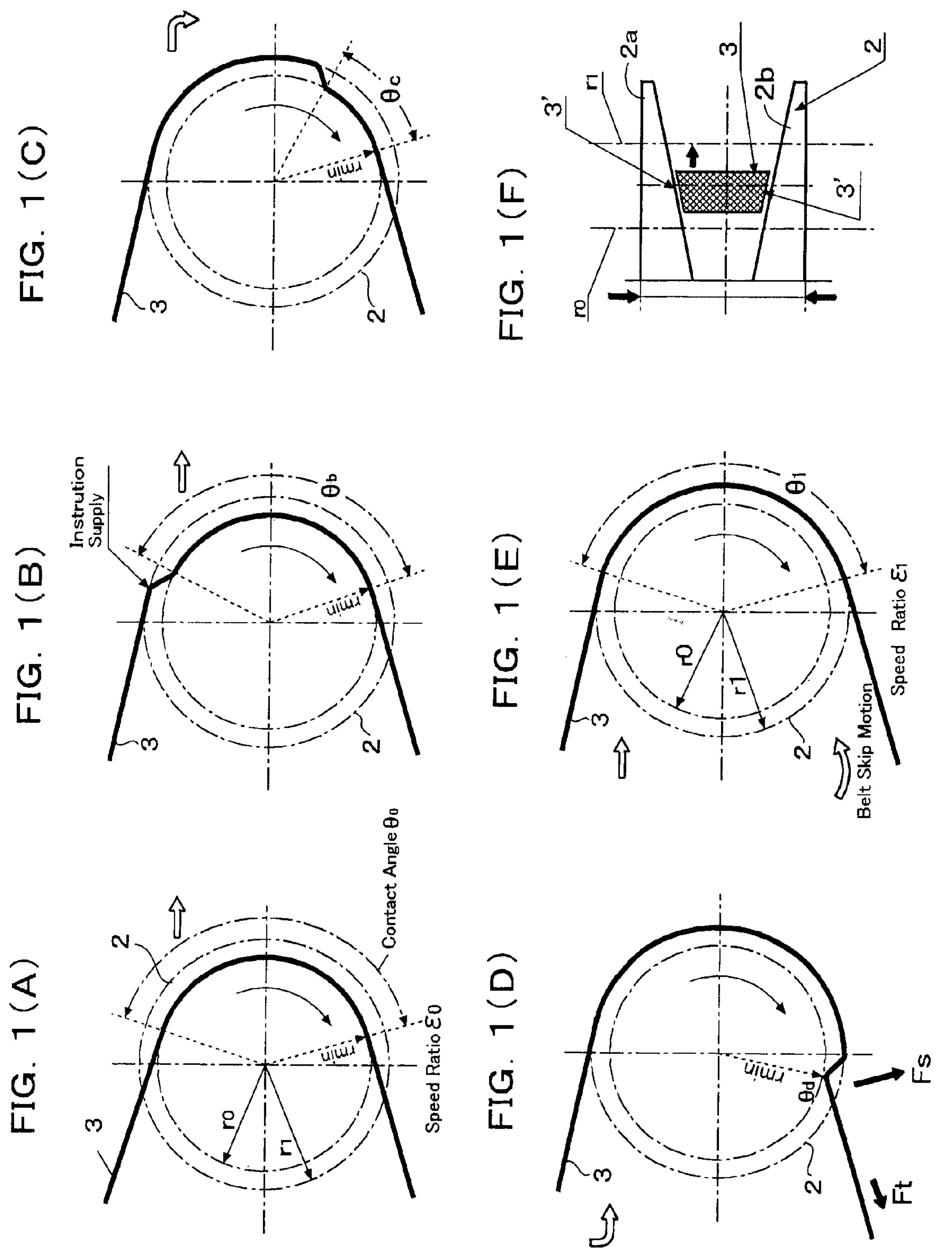
FIGS. 1(A) to 1(E) are views of assistance in explaining variable-speed transmission changing overtime, FIG. 1(D) showing a state where a belt is jumping.
FIG. 1(F) is a partial sectional view of a pulley and a belt.

The present invention can be applied to not only a wet type continuously variable transmission in which both a variable transmission unit and a speed change control unit are immersed in oil and also a dry type in which both or one of the variable transmission unit and the variable speed control unit are provided in air. The transmission according to the present invention can be applied to various technical fields including vehicles and small or large type machines by modifying the configuration and control form thereof. Since constant power horse transmission for a heavy load can be performed, constant torque transmission can be carried out by changing an instruction issued by a controller, which is included in the scope of the present invention. For the constant power horse transmission, the rotation speed of an output side pulley or a secondary pulley is inversely proportional to the frictional force thereof, while, for the constant torque transmission, the rotation speed is proportional to the frictional force. These may be achieved by regulating the control elements of pressure application devices for both the pulleys. Consequently, highly efficient and accurate control can be attained for the pressure application devices. In particular, a small electric motor with a high rotation speed is employed for a vehicular prime mover while the vehicular speed thereof is controlled by the continuously variable transmission to which the present invention is applied, which can realize lightweight and high gas mileage. If a prime mover is of a variable speed type, it is used as a multi-stage transmission, and then the prime mover may be used together with a torque converter that controls only torque.

In the present invention, a pair of functions, namely, a reference pulley function and a follower pulley function are independently supplied to a driving pulley and a driven pulley, i.e. an input primary pulley and an output secondary pulley. Here, transmission operation in which the reference pulley function is applied to the input primary pulley and the follower pulley function is applied to the output secondary pulley is defined as a forward mode transmission operation or a normal mode transmission operation. In contrast to this, transmission operation in which the reference pulley function is applied to the output secondary pulley and the follower pulley function is applied to the input primary pulley is defined as a reverse mode transmission operation.

The present inventive concept does not necessarily need switching between the reference pulley function and the follower pulley function. Where either the forward mode operation or the reverse mode operation is performed in overall speed ratio is included in the scope of the present invention. Accordingly, even if a device for switching the above functions is not employed, where a rotation speed and torque are individually controlled at the time of pressing a single pulley, and where the concept of a semi-elastic force is employed is included in the scope of the invention. When the transmission has function switching ability, an amount to be operated can be calculated by storing in advance the position of a belt upon stoppage of transmission or based on information about an encoder speed ratio. The switching operation can be performed either automatically or manually, while also the switching operation can be carried out not only in transmission but in non-transmission. Incidentally, in the present specification, non-elastic pressure and elastic pressure are referred to as simply pressing force and elastic force, respectively. In addition, the elastic force in which elastic vibration is suppressed by the pressure upon the simultaneous application of the pressure and the elastic force is defined as semi-elastic force, which is included in the concept of the elastic force.

The pulley functions, namely, the reference pulley function and the follower pulley function can be switched at an arbitrary speed ratio or an outputted rotation speed. While a switching mechanism for switching the pulley functions is indicated as a combination in common use of instruction supply paths for regulating speed change, driving source , and sliding devices described below, these components may be arranged separately. For instance, other switching devices of transmissions, power supply paths, compressing devices and driving sources may be disposed separately. In the case where an outputted rotation speed and torque require the so-called bumpless switching like a vehicle, an engagement device needs completing the displacement of Ir $\alpha$ with high accuracy in a short time upon switching. The reason is that slow switching of the functions brings both the primary and secondary pulleys into an elastic force application state. This shifts the belt to the higher elastic force side pulley, which leads to changing speed. However, it is obvious that a speed ratio or a radius of the belt should not be changed in an unstable state by the elastic force or the semi-elastic force but should be changed and determined by only the pressing force to the reference function pulley. Then, an instruction for making the elastic forces uniform may be applied to both the pulleys. However, in order to shorten an operation time, it is preferable to response to that by a quick instruction of a pulse-driving source that is used to temporarily increase the amount of pulses to be supplied.

Even if the radius of the belt on the reference pulley side changes on a proportional basis, the radius on the follower pulley side changes not on the proportional basis but on a quadratic equation basis. In the following embodiments, an instruction for regulating the displacement of each movable disk of the primary and secondary pulleys can be supplied to the pulleys individually. Therefore, a gap 1$r\alpha$ between two sliding members of the engagement device can be kept in a narrow, constant value state at all times by compensating in advance the displacement with high accuracy. This enables high accurate bumpless switching during high-speed transmission without applying any disturbances to the position of the belt.

Transmitting members, such as belts and elastic bodies vary in a dimension due to the ambient temperature or aging changes, which leads to errors in speed change, or a deterioration in transmitting efficiency. Accordingly, when it is unnecessary to control the rotation of the transmitting members with high efficiency and accuracy, the rotation may be controlled using the operational amount for initial setting. On the other hand, when it is necessary to control the rotation with high efficiency and accuracy, a CPU may calculate a compensating amount based on a rotation speed, erroneous amounts detected by a pressure sensor, and predetermined values stored in advance to add the calculation results to instructions to each operating end.

In the case where vehicles or the like travel at a low or high speed, the degrees of the transmitting efficiency and the safety factor of transmission can be selected arbitrarily. In addition, when they halt, instructions that forced compression applied to an elastic body on a highly compressive side should be removed may be supplied to the elastic body so as to avoid the deterioration thereof.

In the following description, various changes and modifications may be applied to devices and components in many ways. Pressure application devices, compound compressing devices, compressing devices, elastic devices or engagement devices may be configured to operate not only in a non-rotary state but also in a rotary state. Also the mounting positions thereof may be arranged not near the pulleys but remotely from the pulleys using a pressure transmission device or the like. As long as the compressing devices are able to apply in parallel the elastic force and the pressing force to the movable disk, they may be freely arranged with respect to the elastic devices and the engagement devices. In the case where the compressing device is disposed between the movable disk and the elastic device, it is necessary to support the overall compressing device in a floating condition so that elastic vibration can be transferred.

In a compound compressing device, a term of the compound means that two compressing devices are disposed each other in an adjoining position within a pressure application device.

The elastic device may be an elastic body having other forms, such as a coil spring or the like, in addition to a disc or dish spring. The engagement device may include either an engaging portion or guiding portion when switching of the functions is not needed; however, the engagement device needs at least the engaging portion when the switching of the functions is needed. Sliders, sliding bodies or sliding members constituting the above devices may be used in a sharing manner and replaced with other members, such as a main body, pulley, gear, and lever. A reversible motor may be a DC or AC servomotor, or open-loop stepping motor with or without an encoder depending on uses.

It is necessary to avoid the mutual interference of erroneous signals between a driving source and the movable disk as well as between two compressing devices. Accordingly, a self-locking function, that is, a reverse flow or reverse rotation preventing function should be provided in an instruction supply path. In addition, functions of positively eliminating the causes of an erroneous signal, such as an overrun of the motor, inputted to or outputted from instructions should be provided. Therefore, there must be employed a metal surface contact friction means, such as trapezoidal screw thread, worm gear, clutch, stepping motor with a brake or reverse prevention.

Incidentally, the present invention is not limited to an example where the displacement amount 1*r* of the movable disk and the compression amount 1*t* to be applied to the elastic body are supplied to the two pressing ends of the compound compressing devices, respectively. Substantial pressing control may be achieved by supplying reverse displacement amount of −1*r* to an instruction of the compressing device connected to the engagement device at the superposing end thereof, and supplying the displacement amount 1*r* and the compression amount of the elastic body 1*t* to an instruction of another compressing device connected to the elastic device at the individual pressing end. Thus, operating amounts and directions in a rotation speed instruction and torque instruction may be changed in various manners. For example, in the case of a winding-sliding device, well known elements, such as the rotational direction of a motor and the direction of winding screw thread may be appropriately selected. Further, the compressing devices may be a hydraulic cylinder or of a cam driven type.

[First Embodiment]

Referring to FIGS. 2 to 7, there is shown a continuously variable transmission 10 to which a pulley pressure control system 10B is applied according to a first embodiment of the present invention. The continuously variable transmission 10 includes a variable-speed transmission apparatus 10A having an input primary pulley (driving pulley) 1, an output secondary pulley (driven pulley) 2, and a press type belt 3 wound around the primary and secondary pulleys 1 and 2, and the pulley pressure control system 10B, which is a variable-speed control system for a transmission for controlling, by means of a control unit 90 shown in FIG. 4, an primary pulley pressure control system 9 and an secondary pulley pressure control system 8 disposed on one plane. In this embodiment, an input side pressure application device 10' includes an input compound compressing device 30, an input elastic device 50, an input engagement device 55, and two input driving sources 71 and 75. Another output side pressure application device 20 has components generally similar to those of the above input side pressure application device 10', that is to say, an output compound compressing device 40, an output elastic device 60, an output engagement device 65, and two output driving sources 81 and 85.

The secondary pulley pressure control system 8 includes a pressure transmission device 100 that makes it possible to remotely dispose the secondary pulley pressure control system 8 on the rear side of the secondary pulley 1.

In the present embodiment, each of the pressure application devices is capable of adjustably applying either both or one of a pressing force and an elastic force to each of the pulleys so as to carry out individual control and compensation for control factors, such as a rotation speed and torque, while distinguishably supplying a reference pulley function and a follower pulley function to each of the pulleys so as to stably apply torque and improve transmission efficiency.

Incidentally, since the same functional components are included in the input side and output side mechanisms in this specification, the terms of "input" or "input side" and "output" or "output side" will be omitted when they are understood from a context or reference numerals except that they will be attached when it is necessary to distinguish the input side from the output side in a context.

The variable-speed transmission apparatus 10A includes the two variable pitch pulleys, namely, a primary pulley 1 and a secondary pulley 2 disposed oppositely each other in the arranging direction on an input shaft 1*c* and an output shaft 2*c*. The primary pulley 1 has a movable disk 1 a and a fixed disk 1*b* disposed oppositely and the movable disk 1*a* is slidable, through a key, toward the fixed disk 1*b* in the axial direction of the pulley 1. Similarly, the secondary pulley 2 has a movable disk 2*a* and a fixed disk 2*b* disposed oppositely and the. movable disk 2*a* is slidable, through a key, toward the fixed disk 2*b* in the axial direction of the pulley 2. The primary pulley 1 is supported by a pair of bearings 5, 5*a* and 7, and the secondary pulley 2 is supported by a pair of bearings 4, 4*a* and 6. Between a body 10 and the movable disk 1*a* is supported by a pair of bearings 5 while separating a rotational force and the pressure application device 10' operatively presses the movable disk 1*a*. Similarly, between the body 10 and the movable disk 2*a* is supported by a pair of bearings 4 while separating rotational force and the pressure application device 20 operatively presses the movable disk 2*a*.

The body 10 includes a first body 10*a* for housing other transmission devices of vehicles or the like and a secondary body 10*b* for housing the continuously variable transmission 10. The first and secondary housings are separably fastened to each other. The pulley pressure control systems 8 and 9 are intensively disposed in the second body 10*b* in such a manner as to be attached to and detached from the first body 10*a*, and remotely controlled by an electric instruction from the control unit 90 disposed separately from the controllers 8 and 9.

Figure 7A:
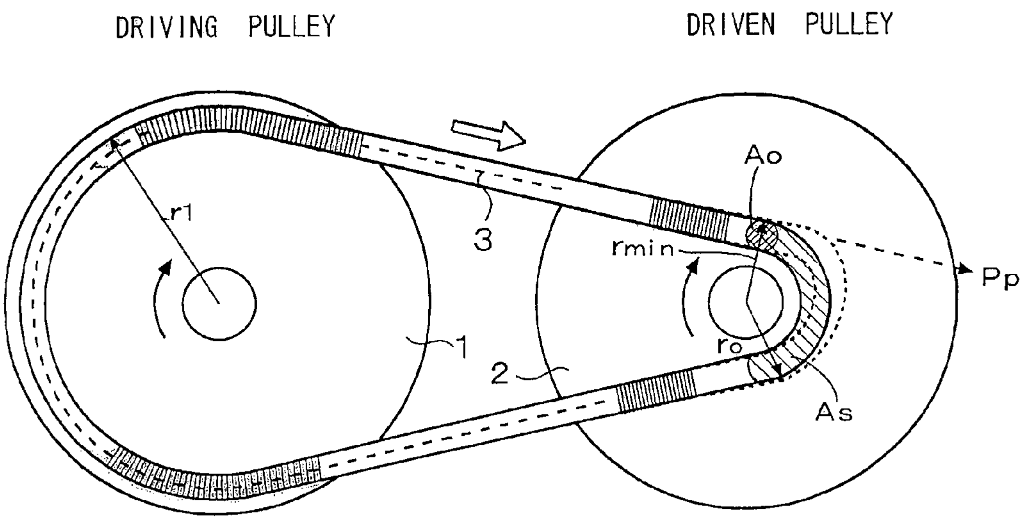
FIGS. 7(A) and 7(B) are a view showing a state of a press type belt and a diagram showing transmission capability characteristics, respectively, on the basis of the effects according to the first embodiment.
Figure 9:
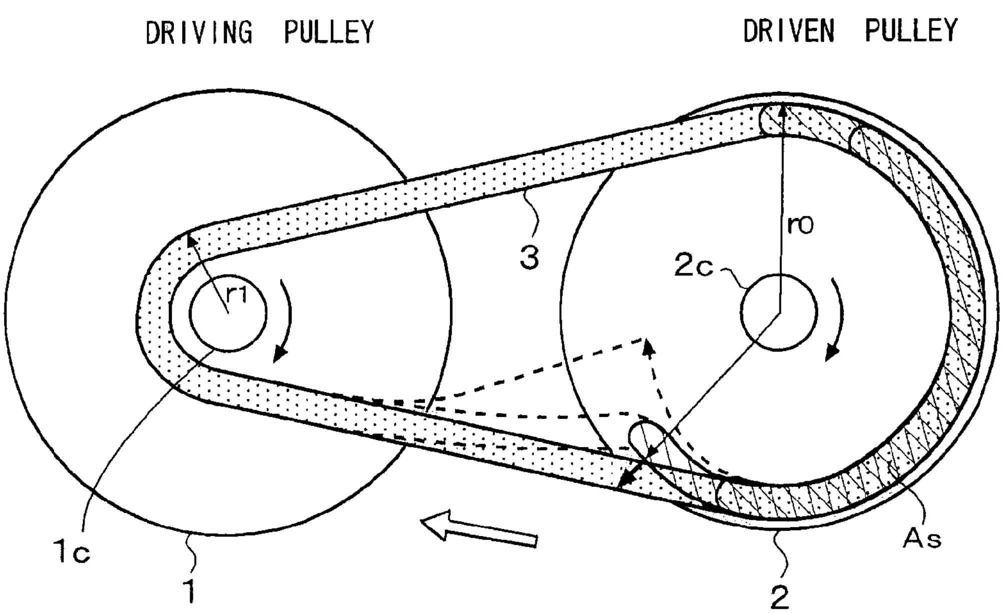
FIGS. 9(A) and 9(B) are a view of a friction surface of a pull type belt according to the second embodiment and a diagram showing transmission capability characteristics, respectively.
Figure 9:
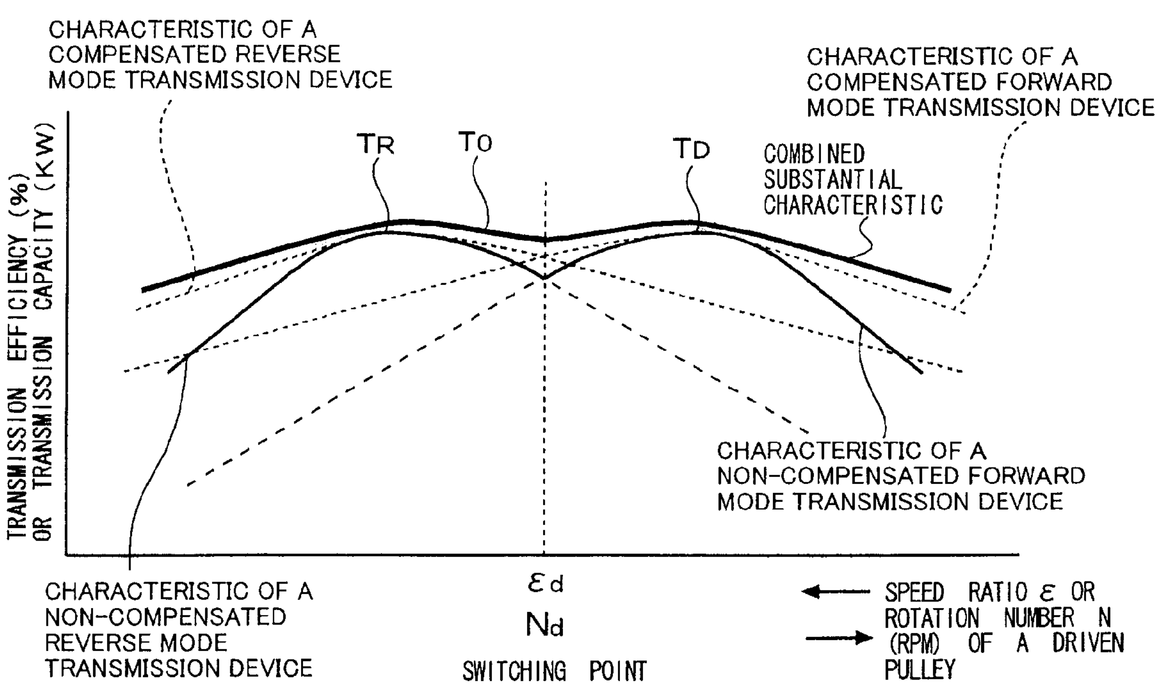

There are known two types of the V-belt 3, that is, a press type in which the primary pulley presses the secondary pulley as shown in FIG. 7A; a pull type in which the primary pulley pulls the secondary pulley as shown in FIG. 9A. For instance, the press type is known from U.S. Pat. No. 4,493,681, and the pull type is known from U.S. Pat. No. 3,949,621. As shown in FIG. 7A, as the contact area As of the press belt 3 reduces at the secondary pulley side in a high-speed range, the normal radius $r_0$ irregularly varies due to a forced pressure $P_p$ indicated by broken lines, as a result of which the contact area reduces more and more, resulting in a point contact $A_0$. Consequently, a slipping state involving insufficient frictional force occurs, thereby worsening transmission efficiency. On the other hand, as shown in FIG. 9A, the frictional force of the pull belt 3 becomes excessive on the secondary pulley side in a low-speed range due to the application of a large elastic force, resulting in a belt winding state at the radius $r_0$. Accordingly, the transmission efficiency worsens due to friction braking. The present invention is devised to also overcome such disadvantages concerning the configuration of the belt.

The pulley pressure control systems 9 and 8 apply either one or both of a pressing force and an elastic force to the associated movable disks 1*a* and 2*a*, respectively, in accordance with instructions at an arbitrary speed ratio. The pressing force and elastic force are individually adjustable in the selection of types of supply pressure and arbitrary value of pressure. If the pressing force is applied to the movable disk, the position of a V-groove of the belt 3 is displaced only when an instruction is supplied to the associated pulley pressure controller, whereas after the instruction is stopped, the position of the V-groove is fixed. That is to say, the pressing force is not positively applied to the belt so as to fix the reference position of the belt, which serves as a rotation speed control function referred to as a reference pulley function. On the other hand, if the elastic force is applied to the movable disk, the application of a desired frictional force to the contact surface of the belt is always ensured, which serves as a torque control function referred to as a follower pulley function. This function eliminates an error factor such as wear of the belt, internal and external disturbances/vibration, whereby the pulley is adjustably returned to a normal transmission when such error factor occurs. In the belt type transmission, the output horsepower P (w) of the follower pulley (secondary pulley) is expressed by:

$$P=1.02\times N\times T$$

where N (rpm) is a rotation speed and T (kg-m) is torque. Therefore, a combination of a pair of functions, which acts as both the functions of the reference pulley and the follower pulley, is essential to two pulleys, that is, the primary pulley and the secondary pulley.

The input side pressure application device 10' included in the pulley pressure control system 10B is substantially identical to the output side pressure application device 20 in a mechanism and function. The input side pressure application device 10' includes input individual pressure application devices 11 and 31, disposed between the movable disk 1*a* and the body 10*b*, which press in series the input elastic device 50 having an input elastic body 51 and the input engagement device 55 individually at two pressing ends of the compound compressing device 30. With this configuration, an input pressing force supply path 55A and an elastic force supply path 50A are arranged in parallel, whereby control elements are individually adjusted. Similarly, the output side pressure application device 20 includes output individual pressure application devices 21 and 41, disposed between the movable disk 2*a* and the body 10*b*, which press in series the output elastic device 60 having an output elastic body 61 and the output engagement device 65 individually at two pressing ends of the compound compressing device 40. With this configuration, an output pressing force supply path 65A and an output elastic force supply path 60A are arranged in parallel, whereby the control elements are individually adjusted. As describe above, the basic configuration of the input side pressure application device 10' is the same as that of the output side pressure application device 20. Differences between the pressure application devices 10' and 20 in construction reside in that the former 10' is formed into an annular shape in an axial direction and disposed coaxially with a shaft 1*c*; the latter 20 is formed like a massive body without a through hole and disposed coaxially with a shaft 2*c* behind the fixed disk 2*b* at a position remote from the movable disk 2*a*.

The compound compressing device 30 comprises a primary compressing device 14 and a secondary compressing device 34 that are connected to each other. The primary compressing device 14 includes a sliding device 13 and an operating device 12 that operates the sliding device 13. The sliding device 13 has a pressing device 15 disposed between two sliding members 16 and 17. Similarly, the secondary compressing device 34 includes a sliding device 33 and an operating device 32 that operates the sliding device 33. The sliding device 33 has a pressing device 35 disposed between two sliding members 36 and 37. In this embodiment, the pressing devices 15 and 35 are ball-screws and the operating devices 12 and 32 are worm gear transmitting devices. This transmitting device prevents counterforces of the pressure and elastic force so as to perform a self-locking function. Each of the sliding members 17 and 37 of the sliding devices 13 and 33 is in sharable use with respect to the pressing devices 15 and 35 and also an external treaded groove 15*a* is in sharable use. The sliding member 16 of the primary sliding device 13 is used together with a wheel 19 of the operating device 12. The shaft 18*a* of the worm gear 18 acts as a primary instruction input end. Upon reception of an instruction, the sliding member 16 turns around the shaft 1*c* while only the sliding member 17 slides upwardly or downwardly without rotation. On the other hand, the sliding member 36 of the secondary sliding device 33 slides upwardly or downwardly in concert with the sliding member 17 to thereby spline-press guides 36*a* and 39*a* disposed between the wheel 39 and the sliding member 36. The shaft 38*a* of a worm gear 38 acts as a secondary instruction input end. Upon reception of an instruction, the sliding member 36 rotates along with the wheel 39 and slides upwardly or downwardly also relative to the sliding member 17. With this configuration, the compound compressing device 30 provides an individual pressing end 11A directly transmitting pressing force and displacement to the movable disk 1*a* by the common sliding member 17 of the individual pressure application device 11 in response to the operation of the shaft, that is, the instruction input end 18*a*. In addition, the compound compressing device 30 provides a superposing pressure end 31A wherein the displacement of the sliding member 36 of the individual pressure application device 31 is superposed in series with the displacement of the common sliding member 17 by the sliding member 36. Both the wheels 19 and 39 are supported by a pair of bearings 7*a* and 7*b*, respectively, and superposed pressure at both the pressing ends 11A and 31A is transmitted to the body 10*b* through a bearing 7*c* and a pressure sensor 94.

The engagement device 55, which is connected in series to the pressing end 11A, is composed of two sliders 56 and 57. One slider 56 is formed integral with the common sliding member 37. The other 57 applies a pressing force to the movable disk 1*a* via the slider 56 and the bearing 5. The sliders 56 and 57 have engaging portions 56*a* and 57*a*, respectively, which are switchably controlled as a switching device in such a way as to be moved into or out of contact with each other in response to an instruction from the pressing end 11A. In addition, the sliders 56 and 57 have guide portions 56*b* and 57*b*, respectively, each of which is formed as a spline member for causing elastic vibration while the sliders 56 and 57 are positioned apart each other. When the sliders 56 and 57 are positioned in contact with each other, the pressing end 11A applies a pressing force to the movable disk 1*a*, and therefore, the primary pulley 1 performs the reference pulley function. When the engagement between the sliders 56 and 57 is released, a gap with a constant value $1r\alpha_1$ is produced, whereby the application of a pressing force from the pressing end 11A to the movable disk 1*a* is stopped, and instead of it, the elastic force that is provided in parallel to the pressing force is applied to the movable disk 1*a* to supply a follower pulley function to the primary pulley 1 thereafter. The slider 57 is retained by the retaining member 54' attached to the body 10B, which prevents the sliding member 37 and the engagement device 55 from rotating.

The elastic device 50 connected in series to the pressing end 31A includes an elastic body 51, two sliding bodies 53 and 54 that are oppositely placed, a thrust bearing 58, and a seat 59 of the thrust bearing 58. The elastic body 51 is made of eight dish springs, two of which are placed in parallel with each other, which forms four-segment in series. The entire elastic device 50 is disposed concentric with the outer circumference of the engagement device 55. The pressing end 31A, in response to an instruction, provides a gap 52 indicated by a broken line between the seat 59 and the pressing end 31A, which allows supplying pressure to be zero. The elastic body is supported in a floating condition while its elastic vibration cannot be transmitted from one end of the elastic body but can be transmitted from the other. Since the sliding body 54 is substantially formed integral with the slider 57, the elastic force is applied to the movable disk 1*a* of the primary pulley 1 together with the pressing force via the bearing 5. The present embodiment is characterized in that the superposing pressing end 31A allows the elastic device to be adjustably pressurized in accordance with a primary instruction and a secondary instruction irrespective of the pressing condition of the pressure supply path 55A composed of the pressing end 11A and the engagement device 55. To be more specific, although the pressure of the engagement device 55 applied to the movable disk 1*a* is stopped to thereby fix the position of the V-groove of the movable disk 1*a*, the elastic force is independently supplied to the movable disk 1*a*. In addition, a frictional force between the belt 3 and the primary pulley 1 can be externally regulated by the application of a semi-elastic force, which is elastic vibration suppressed to a half. Therefore, at this time, the elastic force supply path 50A acts also as a semi-elastic force supply path.

Figure 4:
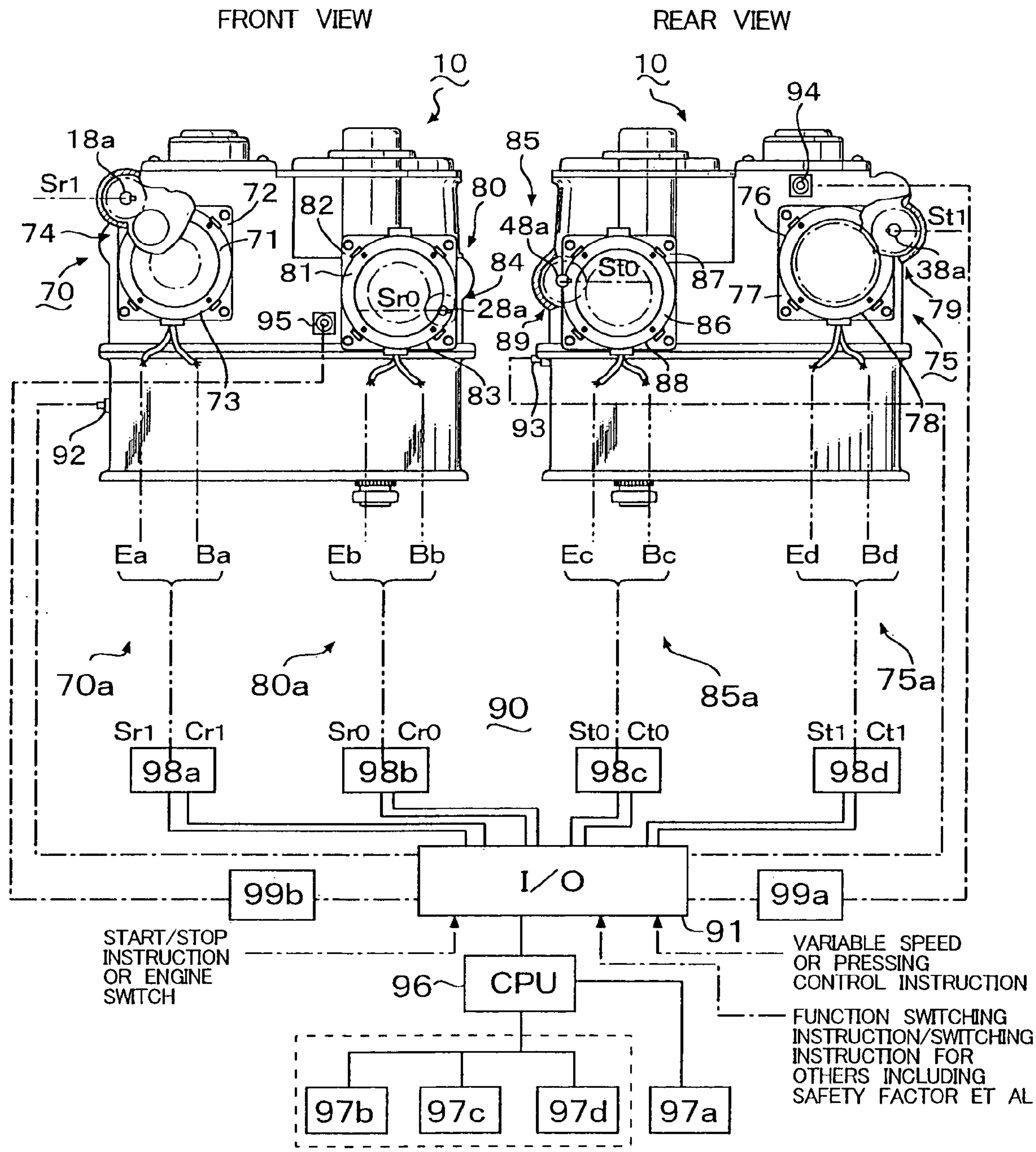
FIG. 4 is a constitutional diagram of a control apparatus connected to four driving sources provided at a front and rear of the transmission according to the first embodiment.

Referring to FIG. 4, the pressure application device 10' is provided with a primary and secondary driving sources 70 and 75 that convert electrical signals, that is, a primary instruction and secondary instruction from the control unit 90 to mechanical signals. The primary and secondary driving sources 70 and 75 include gear heads 72 and 77, reversible pulse motors 71 and 76, brakes 73 and 78, and gearing devices 74 and 79, respectively. Since the driving sources 70 and 75 are mounted on the front and rear surface of the transmission 10, respectively, the front and rear views thereof are separately illustrated in FIG. 4. In the embodiment, the primary instruction $Sr_1$ controls the amount of speed-change displacement $\mathbf{1}r_1$ of the movable disk 1*a* for rotation-speed regulation via a line while the secondary instruction $St_1$ controls the amount of compressive displacement $\mathbf{1}t_1$ of the elastic device 50 for torque regulation via another line. In addition, a pressure switching instruction $Cr_1$ and an elastic switching instruction $Ct_1$ are supplied to the primary pulley 1 for switching between pulley role functions, namely, the reference pulley function and the follower pulley function. After the switching, the superposing pressing end 31A is moved. Further, since it is necessary to change a value of the elastic force to other values, both the switching instructions are supplied simultaneously via the respective lines mentioned above. Incidentally, the switching instructions may be instructions having an operational speed command of the same quality as the regulating instruction. In the embodiment, in order to shorten the switching period of time, the driving sources 70 and 75 act as operation selecting means 70*a* and 75*a*, respectively, which are in combination with drivers 98*a* and 98*d* and stepping motors 71 and 76 capable of selecting pulse step angles supplied in a short time. This enables the switching instruction to quickly response to the regulating instruction in a different signal form.

Figure 2:
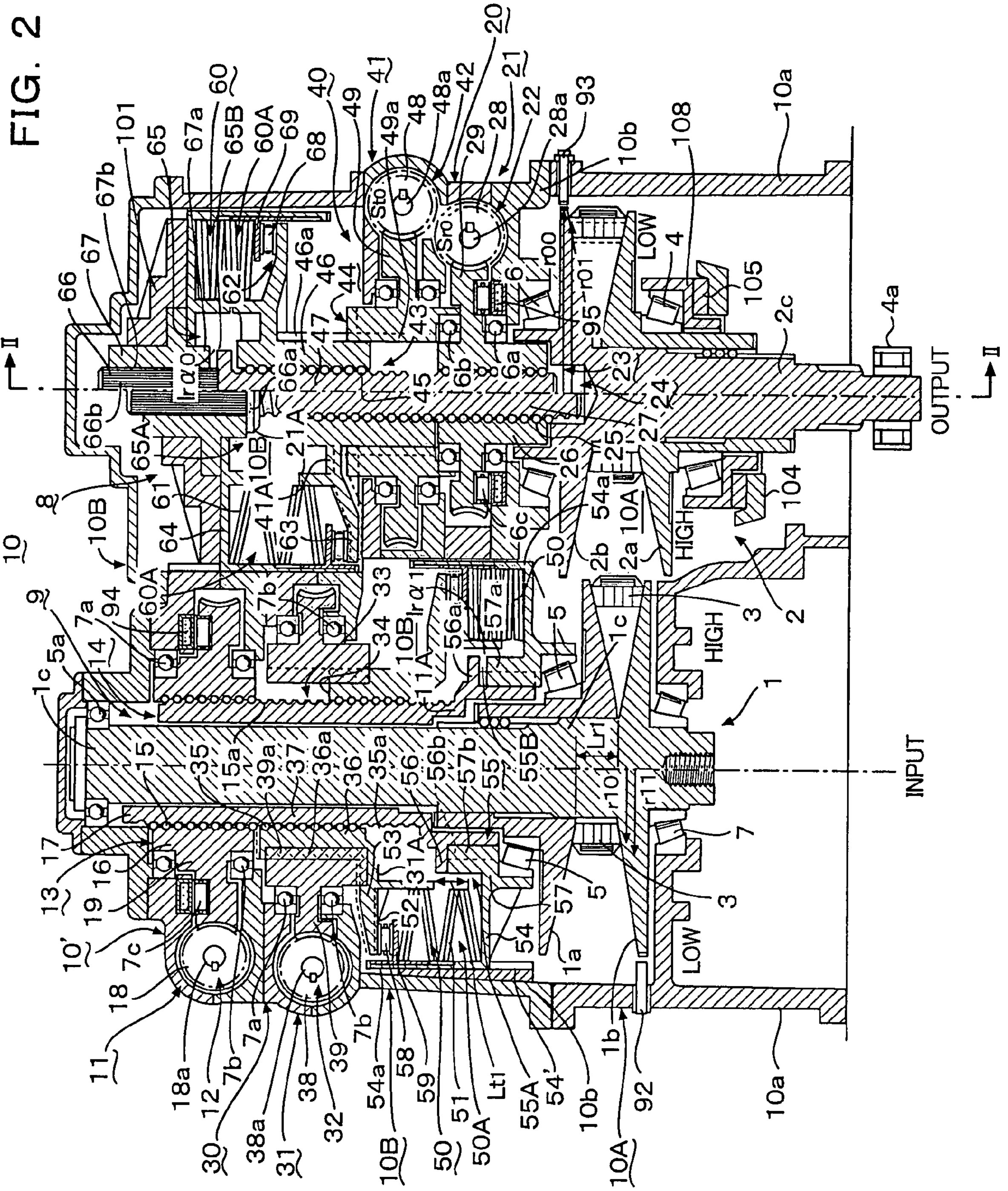
FIG. 2 is a sectional view of a press-belt type continuously variable transmission provided with a pulley pressure control system according to a first embodiment of the present invention.

The output side pressure application device 20 comprises an output compound compressing device 40, an output elastic device 60, an output engagement device 65 and two output driving sources 80 and 85, similarly to the input side pressure application device 10' in constitution as shown in FIG. 2. Therefore, the duplicate description thereof is omitted and the configurations, of the output side pressure application device 20, different from those of the input side pressure application device 10' will be described below. Here, the same parts in the pressure application device 20 as those in the pressure application device 10' are indicated by reference numerals that are ten greater than the reference numerals of the parts in the pressure application device 10'.

First, the output side pressure application device 20 differs in a direction along with the input side pressure application device 10' is disposed. More specifically, the former 20 is disposed in the opposite direction to the latter 10' as shown in FIG. 2. A reason for this arrangement is that the overall pressure application device 20 is disposed remotely from the movable disk 2*a* of the secondary pulley 2. Therefore, means for applying the pressing force and elastic force to the movable disk 2*a* from a reference plane 10*b* of the body via the elastic device 60 and engagement device 65 is substantially the same as the means for applying the pressing force and elastic force to the movable disk 1*a* of the primary pulley 1 as described above. Second, the output side device 20 is different from the input side device 10' in that the output side device 20 has a pressure transmission device 100 for transmitting the elastic force and the pressing force from the output side device 20 to the movable disk 2*a*.

Figure 3:
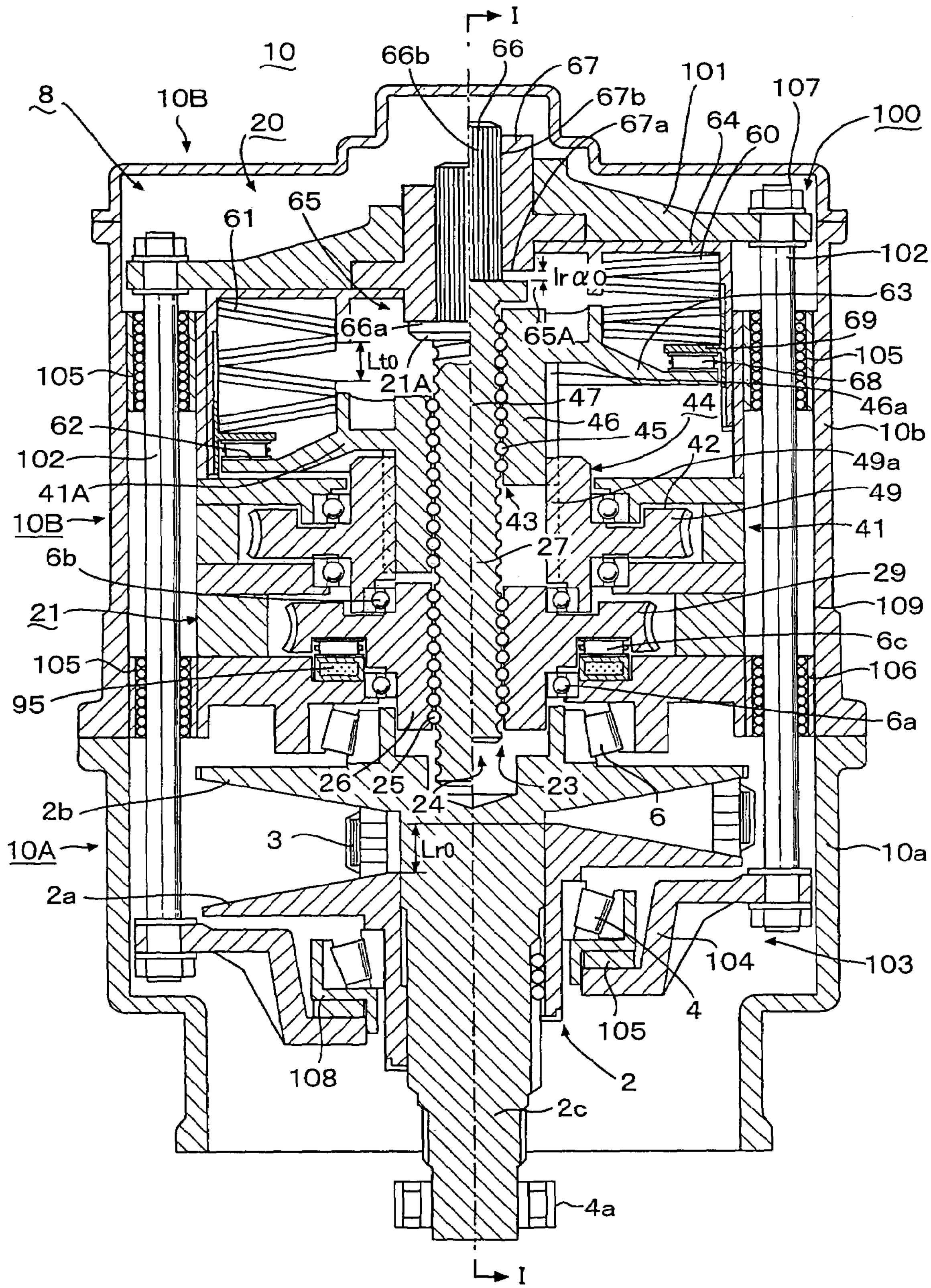
FIG. 3 is a sectional view of an output pulley pressure control system taken along line 11–11 in FIG. 2.

As shown in FIG. 3, the pressure transmission device 100 includes two pressing shafts 102 of a longitudinal transmitting means 103, two levers 101 and 104 of a transverse transmitting means 102, four linear ball bearings 105 and 106 for slidably guiding the pressing shafts 102, and a supporting body 109 for supporting the ball bearings 105 and 106. The three means 101, 102 and 103 form a rectangular frame 107 so that the elastic force and pressure are transmitted to the movable disk 2*a* via gimbals 105, a receiving member 108 and the bearing 4.

Referring again to FIG. 4, the control unit 90 comprises a computing processing device 96 having a CPU, storage device 97 including various RAMs and ROMs, and an interface device 91 including A/D and/or D/A converters and transmission bus for supplying and/or receiving input and/or output information. The inputting information includes speed-change and/or start instructions, such as a start instruction for a vehicular prime mover or the like; a speed-change or a pressing instruction; detected values and the like of detectors 92 and 93 for detecting the rotation speed of each pulley and the pressure sensors 94 and 95 for detecting the pressing force and elastic force applied to each of the movable disks 1*a* and 2*a*. The output information includes regulating instructions $Sr_1$, $St_1$, $Sr_0$, and $St_0$, and switching instructions $Cr_1$, $Ct_1$, $Cr_0$, and $Ct_0$, the both instructions being supplied to four driving sources 70, 75, 80 and 85 through primary and secondary instruction paths Ea, Eb, Ec and Ed as shown in FIG. 4. In addition, there are provided braking instruction paths Ba, Bb, Bc and Bd. The regulating instruction or the switching instruction is selected at the drivers 98*a*, 98*b*, 98*c* and 98*d* in response to a selection signal from the CPU 96. When the primary or secondary switching instruction is issued to increase or decrease the pressure at the input side, the pressure at the output side is synchronously switched and then decreased or increased.

Figure 5:
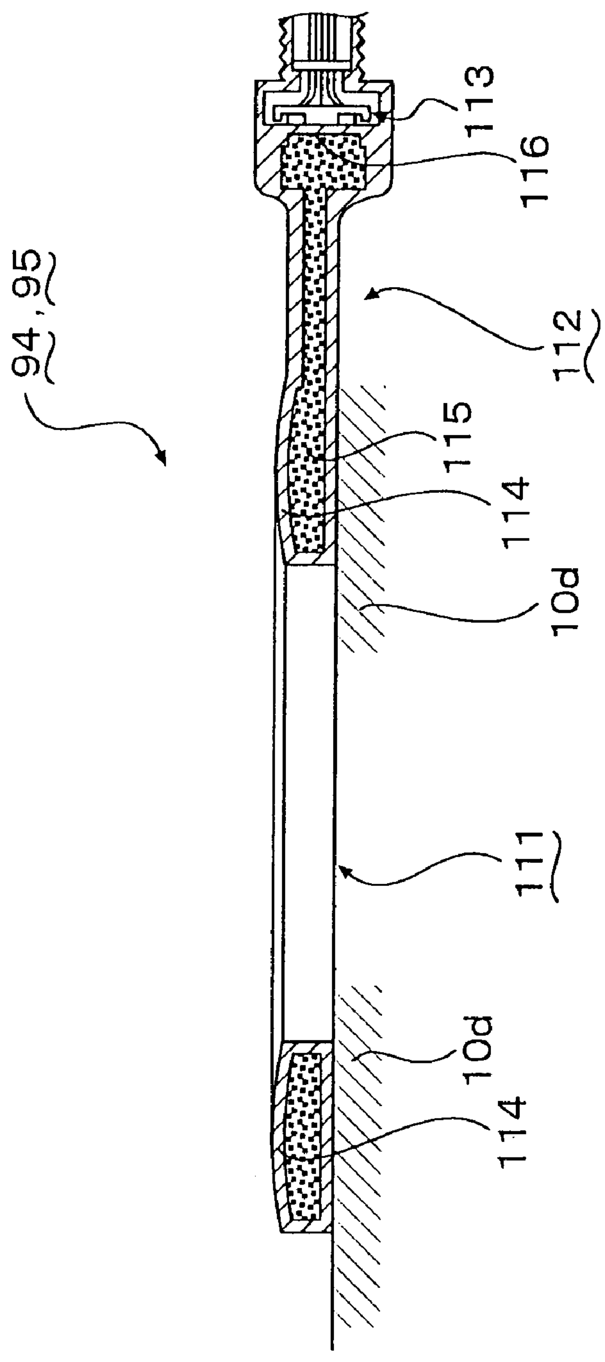
FIG. 5 is a sectional view of a pressure sensor provided on input and output pulley pressure control systems according to the first embodiment.

The storage device 97 stores basic control information 97*a* including basic information for carrying out a programmable control; control information 97*b* for computing a compensating instruction to individually control a speed-change or a pressurizing instruction, rotation speed, and torque; control information 97*c* for operating the transmission 10 in a forward mode; and control information 97*d* for operating the transmission in a reverse mode. Each of the driving sources has a converter-amplifier 98*a*, 98*b*, 98*c*, or 98*d* provided for each motor. The converter-amplifiers 98*a* to 98*d* supplies a pulse signal to the associated motors in response to instructions. The driving source and the control unit are known from, for example, "General Catalogue 1998–1999 Servo Systems" published by Sanyou Denki K.K., and available on the market and hence description thereof will be omitted. The rotation speed detector 92, 93 is composed of a magnet and a coil. As shown in FIGS. 2 and 5, the pressure sensor 94 is disposed between the supporting end of the compound compressing device 30 and the body 10*b* together with the thrust bearing 6*c*. Similarly, The pressure sensor 95 is disposed between the supporting end of the compound compressing devices 40 and the body 10*b* together with the thrust bearings 7*c*. A pressure that will be applied to the movable disk is detected by the pressure sensors. In addition, the pressure sensor 94 (or 95) includes an annular probe 111 wherein fluid medium is filled in a primary diaphragm 114; a led end 112 having a secondary diaphragm 116 placed in a communicating passage extending in a radial direction; and a signal inverter section 113 having a semiconductor strain gauge. The pressure sensor 94 (or 95) detects through filters 99*a* and 99*b* the pressure supplied to the movable disks 1*a* (or 2*a*). Other types of the pressure sensors may be applicable to the present embodiment.

Next, the operation of the transmission in the first embodiment will be described. An object of this embodiment is to compensate a deterioration in transmission performance and reduction in efficiency in a high-speed range, which are disadvantages of the variable-speed transmission apparatus 10A using the press type belt 3. More specifically, the transmission apparatus 10A operates, in a low-speed range, in the forward mode operation as a first transmission device in which the primary pulley 1 acts as the reference pulley and the secondary pulley 2 acts as the follower pulley, while the transmission 10A operates, in a high-speed range, in the reverse mode operation as a second transmission device in which the primary pulley 1 acts as the follower pulley and the secondary pulley 2 acts as the reference pulley. An example will be described in the case where a defect specific to the press type belt is overcome by switching operating states on the way of a speed-change range, and regulating torque by compensating an elastic force for each pulley to thereby improve the transmission efficiency.

In FIG. 2, the left half of the primary pulley 1 and the right half of the secondary pulley 2 show a lowest-speed state, "Low"; the right half of the primary pulley 1 and the left half of the secondary pulley 2 show a highest-speed state, "High". In the Low state, the engagement device 55 on the primary pulley side is in engagement while the engagement device 65 on the secondary pulley side is disengaged because of the gap 65B. It is assumed that, in an initial state, the pressing force is applied to the primary pulley 1 from the individual pressing end 11A, the elastic force is applied to the secondary pulley 2 from the superposing pressing end 31A, the primary pulley 1 acts as the reference pulley, the secondary pulley 2 acts as the follower pulley, constant-speed transmission is performed at a maximum speed ratio $\epsilon$ max, and input power is given to the primary pulley 1 at a constant-speed rotation. In an actual operation, the speed-change instruction is supplied to the transmission 10 as a speed-increasing instruction or speed-reduction instruction at random individually. However, in the embodiment, for clarifying the explanation, an example is described in the case where the primary instructions $Sr_1$ and $Sr_0$ intermittently supply an acceleration instruction and a deceleration instruction, as shown by a solid line and a broken line, respectively, in FIG. 6.

(I) Automatic Switching Action of a Forward Mode Transmission Operation and Reverse Mode Transmission Operation:

An action for automatically switching between the forward mode transmission operation and the reverse mode transmission operation in a speed-change range at an arbitrary predetermined speed ratio $\epsilon$ d will be described below.

An acceleration instruction includes multiple pulses at a fixed interval. The acceleration instruction includes four instructions, such as input instructions $Sr_1$ for a rotation-speed control and $St_1$ for a torque control and output instructions $Sr_0$ for a rotation-speed control and $St_0$ for a torque control which are supplied in synchronism with one another. These four instructions are supplied from the control unit 90 through the four driving sources as transmission modes selecting means and the amplifiers 98 to the reversible motors. All the four reversible motors are operated, whereby the input shafts 18*a*, 38*a*, 28*a* and 48*a* are rotated. On the primary pulley side, the pressing force applied from the compressing device 30 to the primary pulley 1 by the primary instruction $Sr_1$ moves the movable disk 1*a* in response to the amount of displacement $\mathbf{1}r_1$ against the elastic force applied from the compressing device 40 to the secondary pulley 2. At the same time, on the secondary pulley side, an sliding member 27 moves downwardly responsive to the primary instruction $Sr_0$, and also an sliding member 46 moves downwardly in response to the secondary instruction $St_0$, whereby a superposing pressing end 41A removes the elastic force of an elastic body 61 by the amount of superposed displacement $\mathbf{1}_0(=\mathbf{1}r_0+\mathbf{1}t_0)$ that is the sum of the amounts of the displacement $\mathbf{1}r_0$ and $\mathbf{1}t_0$ of both the sliding members 27 and 46.

Figure 6:
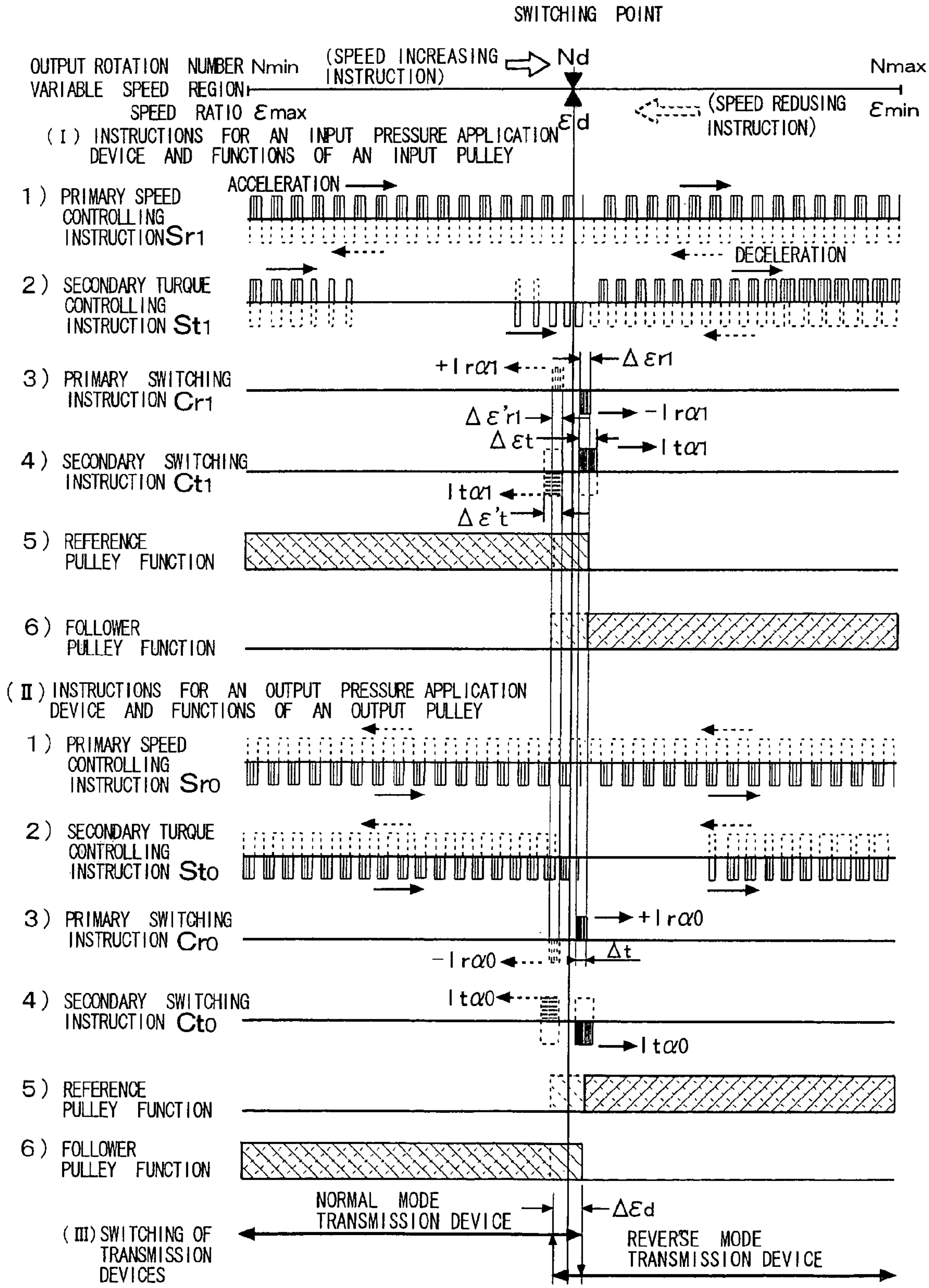
FIG. 6 is a sequence diagram showing instructions from each part of the control apparatus and pulley functions.

At this time, on the input side, the switching instruction $Cr_1$ has been already supplied to remove the gap $\mathbf{1}r\alpha_1$, and the primary pulley 1 acts as the reference pulley. This state continues until the amount of displacement $\mathbf{1}r\alpha_1$ is supplied. Thus, the pressing force caused by the primary instruction $Sr_1$ is directly applied to the movable disk 1*a*. During the application of the pressing force, the movable disk 1*a* and the belt 3 are displaced to increase the radius of the belt 3 from $r_{10}$ to $r_{11}$. When the primary instruction is stopped, the V-groove of the primary pulley 1 is fixed at the speed ratio and the pressure from the pressing end 11A is stopped. At this time, the secondary instruction $St_1$ normally allows to a semi-elastic force to be given to the movable disk 1*a*. Other three instructions are synchronously or asynchoronously supplied in advance so as to make the switching of output torque smooth even if a functional switching instruction is supplied to the movable disk 1*a* at any time. On the output side, the engagement device 65 is disengaged because of the gap 65B, so that the secondary pulley 2 acts as the follower pulley, whereby the elastic force is transmitted to the secondary pulley 2 via the bearing 4 and the pressure transmission device 100 shown in FIG. 3. Since the movable disk 1*a* is forcibly displaced responsive to the primary instruction $Sr_1$, also the movable disk 2*a* and the belt 3 are displaced to reduce the radius of the belt 3 from $r_{00}$ to $r_{01}$. The primary instruction $Sr_0$ is calculated in advance so that the gap 65B is kept at an approximately constant distance $\mathbf{1}r\alpha_0$ before and after the issue of the speed-change instruction. Consequently, the secondary instruction $St_0$ takes the amount of displacement of the elastic body 61 only. At this time, in the constant horse power transmission, the rotational speed and the pressing force of the secondary pulley 2 show inversely proportional characteristics, with the result of which the elastic body 60 is reduced in pressure with acceleration. A series of actions is carried out at the same time. Likewise, when the next acceleration instruction is supplied again, the same actions are repeated. Consequently, as shown in FIG. 6, the output rotation speed is increased up to the supply position αd of the switching instruction in the forward mode, while the frictional force of the secondary pulley 2 is reduced.

In addition, when a speed ratio detected by the sensors 91 and 92 reaches the preset value αd, both the pressure application device 10' and 20 automatically perform the switching of the functions instantaneously. The speed-function switching instruction $Cr_1$ used for forming the gap $\mathbf{1}r\alpha_1$ is supplied to the supply path of the primary instruction $Sr_1$ led to the pressure application device 10' in place of the variable speed instruction, and in synchronism with the supply of the instruction $Cr_1$, a speed-function switching instruction $Cr_0$ for removing the gap $\mathbf{1}r\alpha_0$ is supplied to the supply path of the primary instruction $Sr_0$ led to the pressure application device 20. The torque-function switching instructions $Ct_1$ and $Ct_0$ are supplied to the supply paths of the secondary instructions $St_1$ and $St_0$, respectively, whereby after the switching the elastic force and the semi-elastic force are applied to the primary and secondary pulleys 1 and 2, respectively, in accordance with the speed ratio preset in the storage device 97*d* after the switching. On the input side, the engaged state of the engagement device 55 is released to form the gap 55B, while on the output side, the disengaged state of the engagement device 65 is switched to the engaged state with the gap 65B being eliminated. In addition, the multiple pulses more than the number of the speed-change instructions are supplied to the motors 75*a* and 85*a* in a short time, thereby realizing bumpless-switching, which substantially generates no fluctuations in the output rotation speed of the transmission during the period of the overall switching action.

Thus, the primary pulley 1 acts as the follower pulley after the pressing force supply has been switched to the elastic force supply; while the secondary pulley 2 acts as the reference pulley after the elastic force supply has been switched to the pressing force supply. Therefore, the transmission apparatus 10A acts as a reverse mode transmission operation. The other speed-change instructions are switched such that, as shown in FIG. 6, the output rotation speed is regulated by the output side primary instruction $Sr_0$ and the output torque is regulated by the elastic force applied to the primary pulley 1 by the input side secondary instruction Sti. Consequently, thereafter, stable transmission may be continued in the same manner except that the control unit 90 switches between the control instructions and further between the compensating instructions. When the additional acceleration instruction is supplied, the primary instruction $Sr_0$ allows a pressing end 21A to give a displacement by the amount of displacement $\mathbf{1}r_1$ and the secondary instruction $St_0$ becomes a pressure instruction for preparing the switching using the semi-elastic force. Further, as with the above description, both the instructions $Sr_1$ and $St_1$ on the input side cause the displacement $\mathbf{1}r_1$ of the movable disk 1*a* and the displacement $\mathbf{1}t_1$ of the elastic body 51. Consequently, the sum $\mathbf{1}_1(=\mathbf{1}r_1+\mathbf{1}t_1)$ of the amounts of the displacement $\mathbf{1}r_1$ and $\mathbf{1}t_1$ is supplied to the primary pulley 1 from the superposing pressing end 31A. Thereafter, similarly, the same actions are repeated until a minimum speed ratio ε min is attained, resulting in a state of a minimum speed ratio as shown by the right half of the primary pulley 1 and the left half of the secondary pulley in FIG. 2.

Returning to the maximum speed ratio ε max is carried out by the deceleration instruction of reverse rotation in inverse operating steps to the above described steps. In FIG. 6, during each of the motors stops is indicated by zero; the forward rotation of each of the motors is indicated by a positive state; and the reverse rotation of each of the motors is indicated by a negative state. In an actual operation, zero, positive pulses, or negative pulses torque-function are arbitrary supplied according to regulation. The switching instructions $Ct_1$ and $Ct_0$ are supplied in the same manner. However, in the case of the switching instructions for switching between the forward mode and the reverse mode, a differential is given for a period between the forward and reverse modes so as to prevent hunting. Reasons for synchronously switching between the switching instructions $Ct_1$ and $Ct_0$ for a short time At on the input and output sides are the following. Even for a short time of period the transmission is being performed. Both the engagement devices 55 and 65 are in engagement-released states, respectively, whereby the radius of the belt, toward the elastic force of which is stronger than the other, increases. Accordingly, it is necessary to complete the switching action before the radius of the belt increases. In practice, since the input side elastic force is regulated to the pressure predetermined empirically in consideration of the speed ratio at the current time, synchronously with the output side elastic force, large bumping-torque does not occur. Thus, in the operation of the switching of the functions, both the rotation and the torque are switched in a bumpless-manner.

Figure 7B:
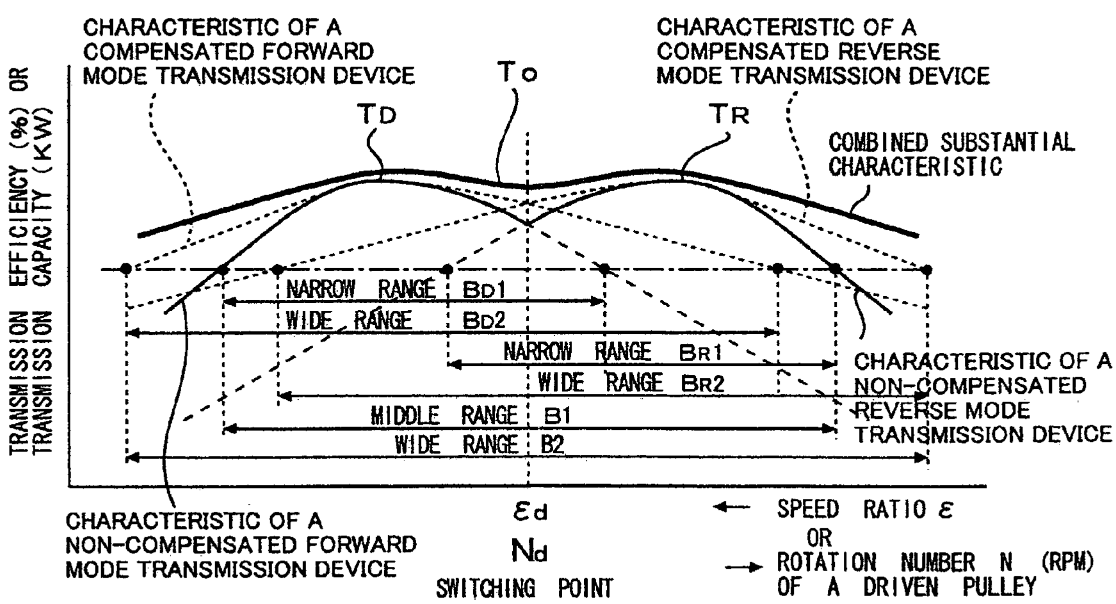

FIG. 7B shows transmission ability characteristics of a speed ratio and a rotation speed. In the press-belt type transmission, at the time of the forward mode operation, the transmitting efficiency becomes worse due to deformation of the belt on the driven pulley (output secondary pulley) side in a high-speed range as shown in FIG. 7A. On the other hand, in the present embodiment, the forward mode operation is switched to the reverse mode operation at the speed ratio e d before the high-speed range. This means that both the primary pulley 1 and secondary pulley 2 in the high-speed range is subject to compensation for reinforcing the contact-frictional force. In other words, in the high-speed range, the elastic force applied to the primary pulley 1 as the follower pulley function is reinforced while the semi-elastic force including the pressing force is applied to the secondary pulley 2 as the reference pulley function so as to positively ensure the frictional force for the secondary pulley 2. It is needless to say that an optimum value of the semi-frictional force is selected from a range where the semi-frictional force is equal to or smaller than the input side frictional force, in order not to change the speed ratio or the radius of the belt predetermined by the primary instruction Sr1 or Sr0. Consequently, depending upon the cooperation with the elastic force to the pulley 1 and the semi-elastic force to the pulley 2, the pressing-deformation of the belt on the secondary pulley side is eliminated and proper torque transmission is carried out due to tension caused by the input side frictional force and the output side frictional force. In addition, a slip in the high-speed range is eliminated due to the reverse mode operation as indicated by a solid line $T_0$ in FIG. 7B, whereby the transmitting efficiency is improved over a wide range.

(II) Forward Mode Transmission Operation in the Overall Speed-Change Range:

An improvement in the transmission ability of the transmission in the forward mode operation can be effected by only positively, adjustably compensating the frictional force caused by the elastic force of both the pressure application devices 10' and 20. In other words, while the primary pulley 1 performs the reference pulley function in which the pressing force is applied to the primary pulley and the secondary pulley 2 performs the follower pulley function in which the elastic force is applied to the secondary pulley, both the frictional forces are adjustably compensated for synchronously or asynchronously over the speed-change range using the semi-elastic force applied to the primary pulley 1 and the elastic force applied to the secondary pulley 2. In the present invention, the pressure application devices 10' and 20 is capable of individually regulating the speed-change displacement 1*r* of the movable disks 1*a* and 2*a* and the compressive displacement 1*t* of the elastic body, respectively. Accordingly, the transmission torque of the primary and secondary pulleys 1 and 2 can be further compensated for the secondary instructions $St_1$ and $St_0$ that determine the frictional force upon changing speed. In the low-speed range, the primary pulley 1 has less frictional force while the secondary pulley 2 has excessive frictional force. Thus, an amount of compensation $\Delta St_1$ may be added to the inputted secondary instruction $St_1$, and an amount of compensation $\Delta St_0$ may be subtracted from the outputted secondary instruction $St_0$; however, either one will do. In addition, in the high-speed range, the primary pulley 1 has excessive frictional force while the secondary pulley 2 has less friction force. Therefore, on the contrary the above, for example, an amount of compensation $\Delta St_1$ may be subtracted from the inputted secondary instruction $St_1$ while an amount of compensation $\Delta S't_0$ may be added to the outputted secondary instruction $St_0$. In either cases, the pressure sensors 94 and 95 attached to the pressure application devices 10' and 20 can accurately perform a variable pressure control using negative feedback control for reduction in the efficiency. FIG. 7B shows the effects of the compensation in the low-speed range and the high-speed range in the forward mode transmission operation by dotted lines placed on both the sides of the top of the characteristics $T_D$. Consequently, as shown in FIG. 7B, this means that a range width of the entire variable-speed range is enlarged from BD1 to BD2.

(III) Reverse Mode Transmission Operation in the Overall Speed-Change Range:

In the case of the reverse mode transmission operation in the overall speed-change range, the compensation for the frictional force in the low-speed and high-speed ranges can be carried out according to the same procedure as that of the above. FIG. 7B shows the effects of the compensation in the low-speed range and the high-speed range in the reverse mode operation by doffed lines placed on both the sides of the top of the characteristics $T_R$. The details of this procedure are the same as those of the above description (II) practically and the description thereof will be omitted. In this case, consequently, the range width BR1 of the variable-speed range is also enlarged to BR2 as shown in FIG. 7B. The most important point resides in that, in any case of (I) to (III) described above, when individually controlling the elastic force of both the primary and secondary pulleys, the semi-elastic force applied along with the pressing force of the reference pulley should be not increased over the amount of elastic-frictional force of the follower pulley so that the speed-ratio determined by the reference pulley function is not affected by the semi-elastic force. Under such constraints, in order to improve the efficiency even further, it is necessary to positively give bending ability or elasticity in a width direction to the belt for enlargement of a continuous contact area. Alternatively, it is necessary to change the material of the frictional surfaces that increases coefficients of friction relative to the pulleys. In addition, the input torque $T_1$ is reduced by the speed ratio $\epsilon$ of the output torque $T_0$, resulting in $T_1=T_0/\epsilon$, theoretically; however, in practice, the coefficients of friction varies with the applied pressure, which does not satisfy the above equation sufficiently. Accordingly, it is necessary to empirically select the amount of elastic force when regulating the output torque based on the input elastic force, and select the spring constants or the like of the two elastic bodies 51 and 61.

In the present embodiment, the switching of the functions and the individual compensation regulation are described separately. However, in practice, all the operations described by the above items (I), (II) and (III) are performed at the same machine, to extend the speed-change range $_0BD_1$ or $BR_1$ to $B_1$, $B_1$ to $B_2$, $BD_1$to $BD_2$, and further $_2BR_1$ to $BR_2$, respectively, as shown in FIG. 7B. In addition, averaged high-effective transmission ability can be realized as characteristics $T_0$ shown in FIG. 7B, which is performed in combination with forward mode and reverse mode characteristics TD and TR applied to torque compensation. Additionally, in the present embodiment, the control in which the semi-elastic force used during the reference pulley function follows the elastic force of the follower pulley function is performed in conjunction with the control in which the semi-elastic force is positively used for the compensation. In practice, since the variable-speed transmission itself is carried out even if the semi-elastic force is not applied, most of the semi-elastic force is used for the regulation to compensate for the frictional force. In some cases, the switching of torque is not carried out smoothly when the functions are switched. In such cases, after the semi-elastic force capable of smoothly switching the functions is used momentarily, the functions of the pulleys may be switched. At that time, the secondary instruction that is supplied to the motors 76 and 78 may be a fast-motion instruction that supplies multiple pulses to the motors 76 and 78 in a short time. By the way, a car or the like moves at a low-speed when putting it in the garage. At this time, it is necessary to highly compress the elastic body. While the car halts, the elastic body is in a highly compressed state all the time. Therefore, the secondary instructions $St_1$ and $St_0$ as compensation instructions may be supplied to forcibly remove the compressive force applied to the elastic body.

Another example in which individual regulations given to each control element from the control unit 90 will be described below. If extension in the circumferential length of the belt increases, the radius of the follower pulley 2 increases with the amount of extension of the belt although the radius of the reference pulley 1 remains unchanged. Accordingly, the output rotation speed decreases while the elastic force decreases slightly. Therefore, when switching the functions based on the speed ratios, the sensors 91 and 92 detect the speed ratios, and the compensation may be given to the primary instructions $Sr_1$ and $Sr_0$ to return the speed ratios to those original positions. For the elastic force, similarly, the compensation may be given to the secondary instruction $St_1$ and/or $St_0$. If the width of the belt decreases due to wear, both the radii of the pulleys 1 and 2 change to generate the errors of the output rotation speed and torque. Accordingly, like compensation may be given to each instruction separately. Further, when the dimensions in the compressive directions of the elastic bodies 51 and 61 deteriorate, the storage device 97 may store the initial reference positions such as the value of the elastic force at a maximum speed ratio $\epsilon$ max in advance. In addition, each of the pressure sensors 94 and 95 may detect the amount of the compensation so as to give the detected amount to the secondary instructions based on the initial reference positions.

[Second Embodiment]

Figure 8:
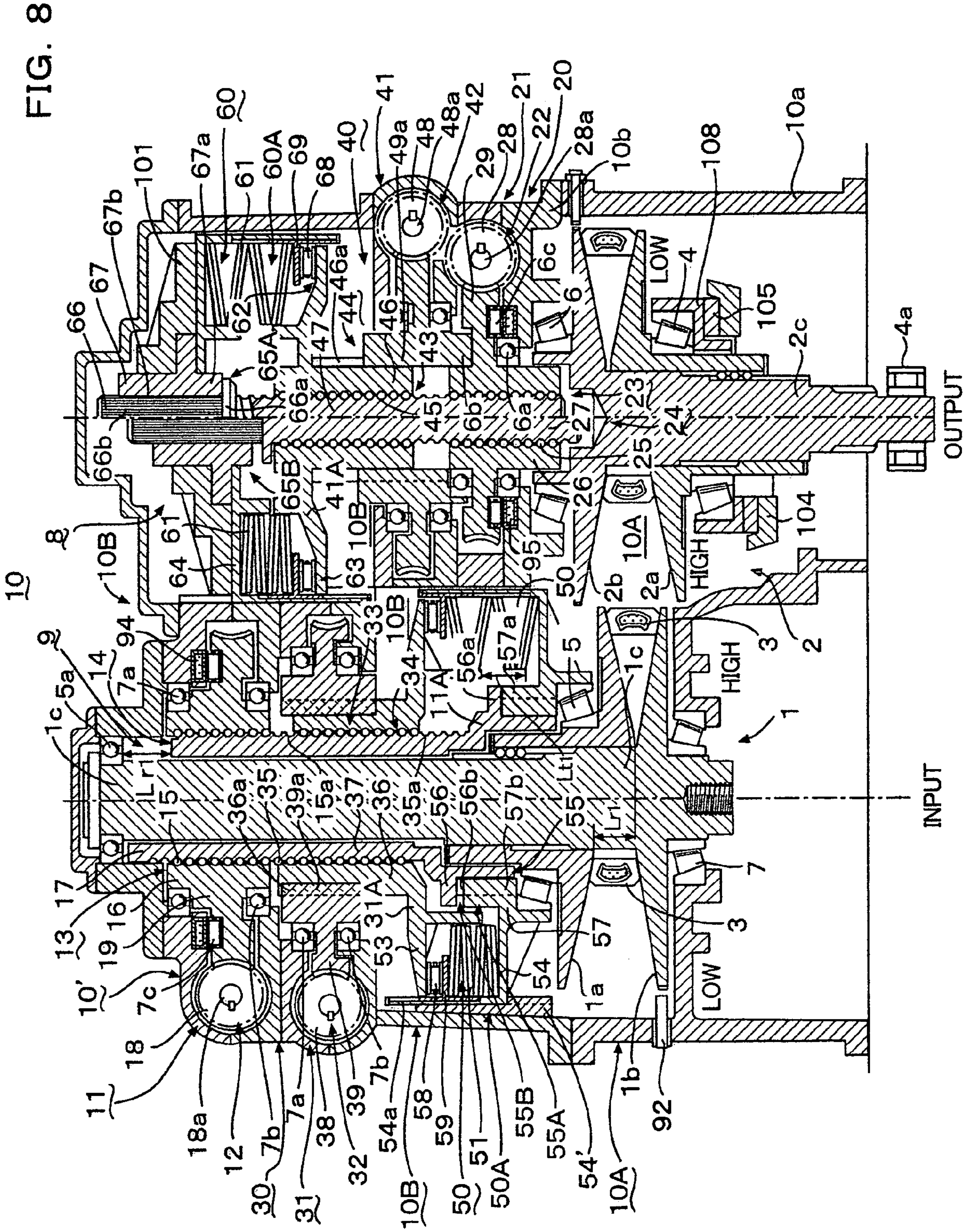
FIG. 8 is a general constitutional section of a pull-belt type continuously variable transmission provided with a pulley pressure control system according to a second embodiment of the present invention.

A pulley pressure control system according to a second embodiment will be described below. FIG. 8 shows a pulley pressure control system 10B according to the present embodiment the configuration of which is the same as that of the first embodiment. However, this embodiment is different from the first embodiment in that the belt 3 is not the press-type but the pull-type. Both the pressure application devices 10' and 20 differ from each other in a control manner, but do not have modified configurations. Therefore, like or corresponding parts are denoted by the same reference characters and the duplicated description thereof will be omitted.

As shown in FIG. 9A, when a large elastic force is applied to the pulley 2 and the belt 3 in the low-speed range, an increase in the contact area between the belt 3 and a driven pulley (secondary pulley) 2 causes an excessive frictional force. Then, at a radius $r_0$, the belt 3 tends to be brought into a wound state in a rotating direction shown by a broken line, which positively brakes the transmission of power, resulting in lowering of the transmission efficiency. In the present embodiment, the pressing method is performed in a reverse manner relative to that of the first embodiment. To be more specific, an elastic force applied to the primary pulley 1 is increased in the low-speed range; conversely, an elastic force applied to the secondary pulley 2 is reduced or removed. In FIG. 8, the left half of the primary pulley 1 and the right half of the secondary pulley 2 show the Low state in the low-speed range. In addition, the right half of the primary pulley 1 and the left half of the secondary pulley 2 show the High state in the high-speed range. These states are the same as in FIG. 2. However, the engagement state and the disengagement state of the engagement devices 55 and 65 are reverse to those in FIG. 2. Also the compressed state and the removed pressure state of the elastic bodies 51 and 61 are reverse to those in FIG. 2.

In the low speed range, transmission is carried out in the reverse mode operation in which the primary pulley 1 performs the follower function using the elastic force while the secondary pulley 2 performs the reference pulley function using the pressing force. In addition, since a semi-elastic force applied to the secondary pulley 2 is reduced as shown in the figure, the V-groove of the secondary pulley 2 is fixed at a position substantially set by the pressing force, and tension of the belt, which is caused by the large pressing force applied to the primary pulley 1, ensures a frictional force of the secondary pulley 2 indirectly. Accordingly, the wound state of the belt on the secondary pulley 2 side does not take place, which solves the lowering of the transmission efficiency. On the other hand, since the wound state of the belt on the primary pulley 1 side similarly occurs, the switching between the pulley functions is carried out at the speed ratio $\epsilon_d$ to enter into the forward mode operation in which the primary pulley 1 performs the reference pulley function and the secondary pulley 2 performs the follower pulley function in the high-speed range. Consequently, the lowering of the transmission ability caused by the excessive frictional force specific to the pull type belt can be improved, as shown by a thin solid line in FIG. 9B. In addition, if torque is compensated for in the low-speed range and the high-speed range, during the forward mode operation and the reverse mode operation, respectively, even the pull-type belt can realize high efficient transmission as indicated by a thick solid line in FIG. 9B in the same manner as the push-type belt. It is quite obvious that other various compensational operations and individual regulations can be performed.

[Third Embodiment]

Figure 10A:
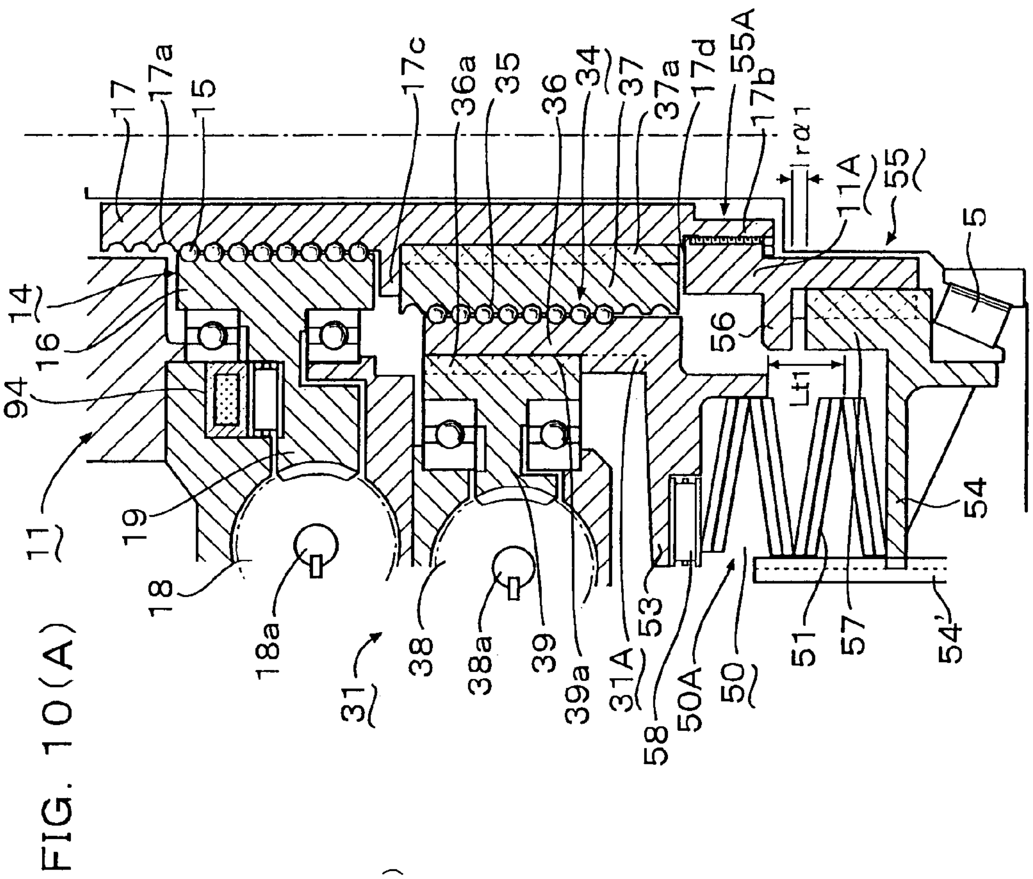
FIGS. 10(A) and 10(B) are partial sectional views of an overlap type and an individual type compressing device, respectively, according to a third embodiment of the present invention.

A third embodiment according to the present invention will be described below with reference to FIG. 10A, which is a sectional view of a pressure application device 10', with the left half thereof illustrated. In the first embodiment, the primary and secondary compressing devices 14 and 34 share the use of the sliding member 17 as shown in FIG. 2. On the other hand, in this embodiment, the primary and secondary compressing devices 14 and 34 operate individually. As shown in FIG. 10A, the secondary compressing device 34 can be wholly pressed by a pressing projection 17*c* provided on the sliding member 17 of the primary compressing device 14. The sliding members 36 and 37 have splines 36*a* and 37*a*, respectively. Thus, the pressing end of the compound compressing device 30 includes the direct pressing end 11A of the primary compressing device 14 and the superposing pressing end 31A wherein the pressures of the primary and secondary compressing devices 14 and 34 are superposed in series. Consequently, the compound compressing device 30 performs the same operation as the compound compressing device 30 shown in FIG. 2.

Figure 10B:
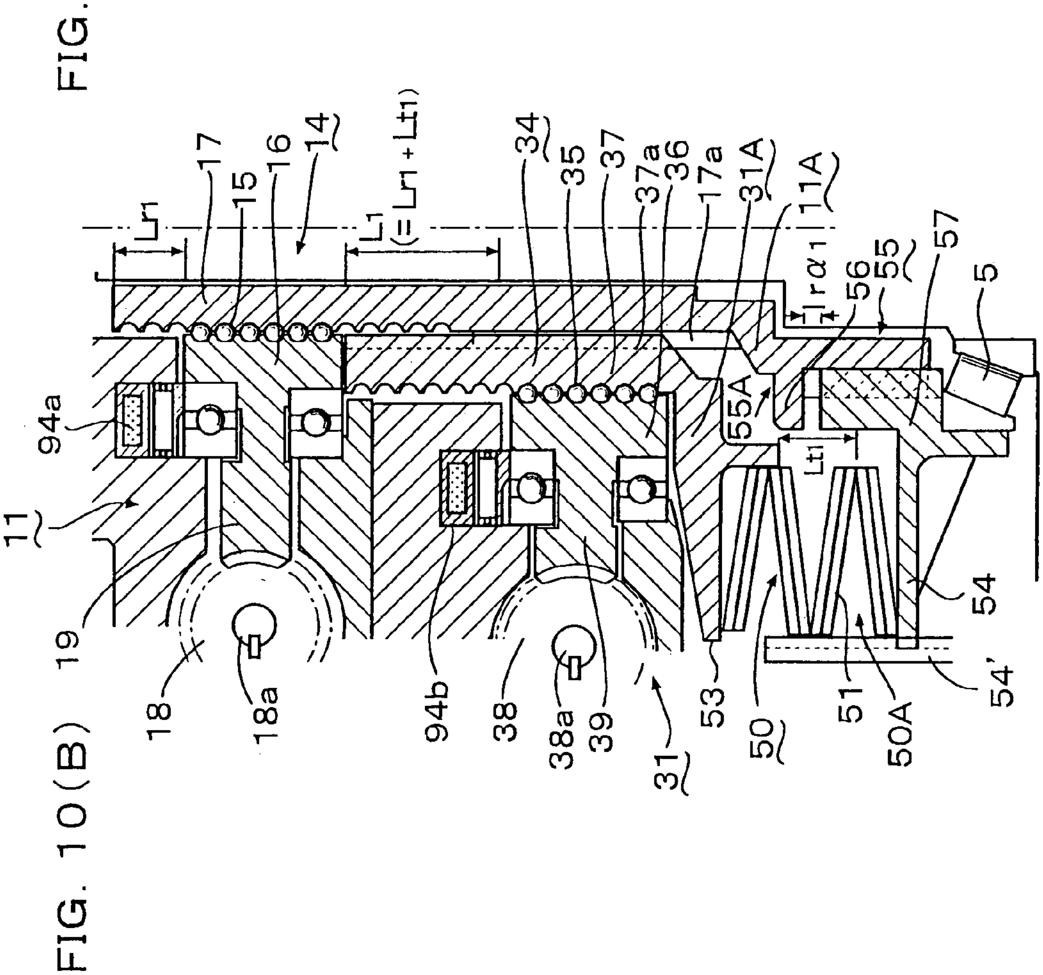

A modified example of the compound compressing device 30 in the third embodiment is shown in FIG. 10B, which is a sectional view of a pressure application device 10', with the left half thereof illustrated as well. In FIG. 10B, spline grooves 17*a* and 37*a* are provided between the sliding members 17 and 37. In addition, the compound compressing devices 14 and 34 each have a pressing end. The pressing end of the compressing device 34 presses the elastic device 50 and the other pressing end of the compressing device 14 presses the engagement device 55. In other words, the pressures of the primary and secondary compressing devices 14 and 34 are not superposed. The sliding member 17 travels a distance $Lr_1$ to supply speed-change displacement to the movable disk 1*a*. The sliding member 37 travels a distance $L_1$ that is the sum of the distance $Lr_1$ and a compressive displacement $Lt_1$ of the elastic body 51. In the example of FIG. 10B, the semi-elastic force can be accurately controlled during the reference pulley function; however, during the follower pulley function, the individual pressure application device 11 does not substantially act on the elastic body 51, so that the secondary compressing device 34 can not divide the speed-change displacement $1r_1$, which is disadvantageous. On the other hand, the pressure and the value of the elastic force during the follower pulley function can be variably controlled independently. In the compound compressing device 30, since the pressing force supply paths of the primary and secondary instructions are separated from each other, even if the switching instruction is given to the primary instruction, smooth torque switching can be carried out without being influenced, at the superposed pressing end, by the pressure supply path of the secondary instruction.

[Fourth Embodiment]

Figure 11:
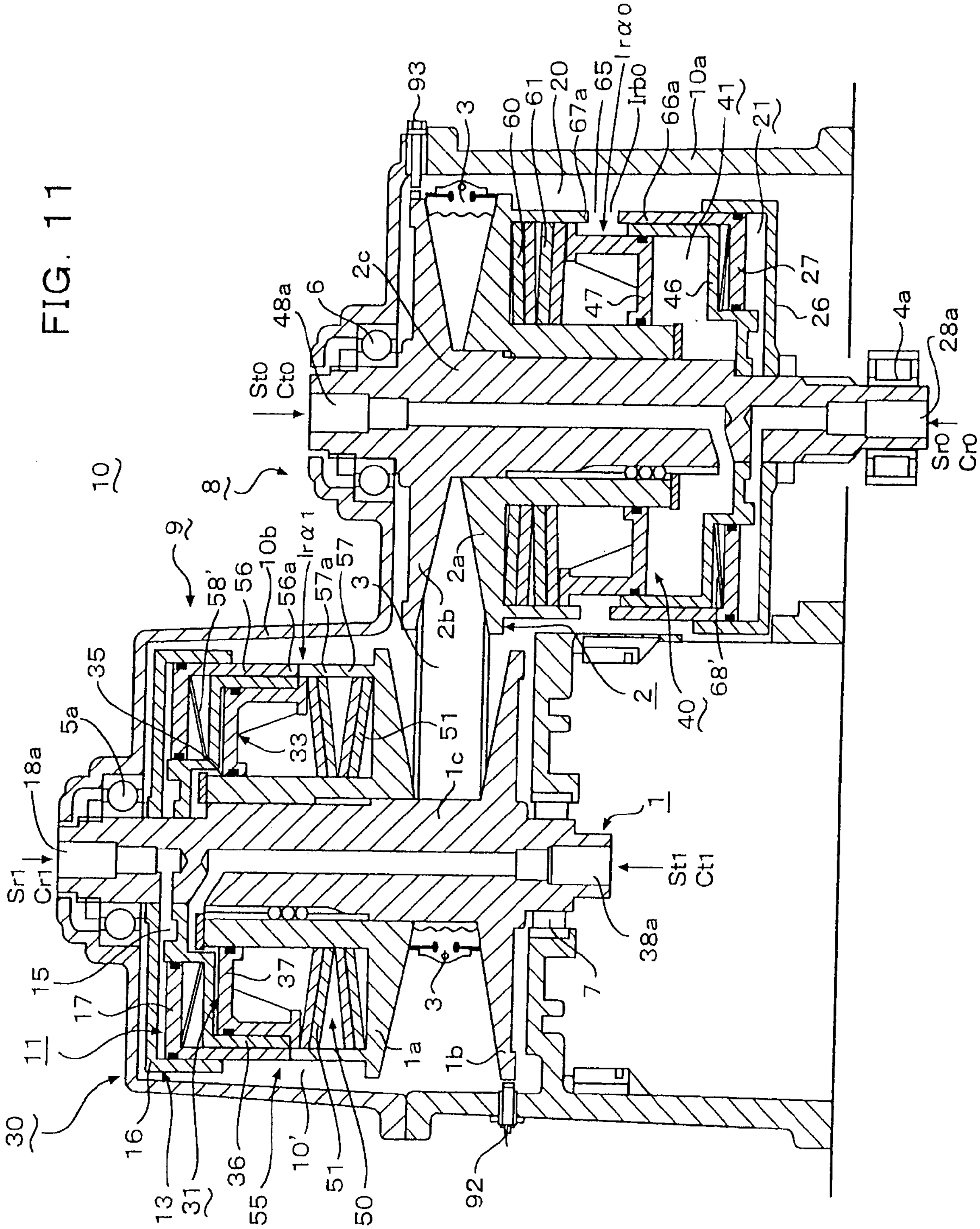
FIG. 11 is a sectional view of a continuously variable transmission provided with another system according to another embodiment of the present invention.
Figure 12:
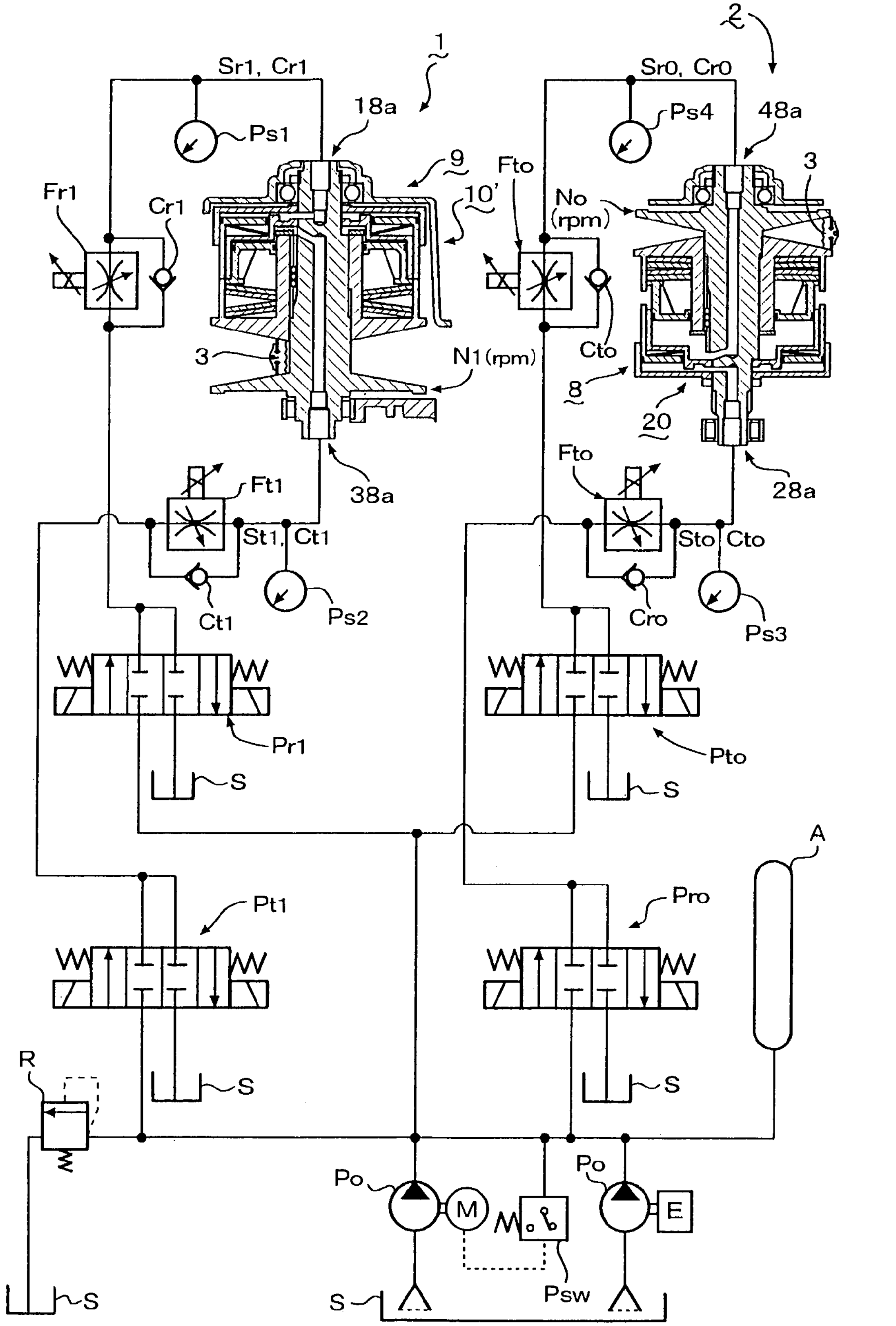
FIG. 12 is a constitutional diagram of a hydraulic circuit applied to the embodiment in FIG. 11.

A fourth embodiment of the present invention will be described with reference to FIGS. 11 and 12. FIG. 11 is a sectional view of a continuously variable transmission according to the present embodiment, while FIG. 12 is a hydraulic circuit diagram of the same in which a hydraulic cylinder is employed as a compressing device. In the figures, components having the similar or corresponding functions to those shown in FIG. 2 each are denoted by like reference character and the duplicated description thereof are omitted.

A compound compressing device 30 includes an electromagnetic directional control valve Pr, electromagnetic flow control valve Fr, check valve Cr, and sensor Ps; similarly, a compound compressing device 40 includes an electromagnetic directional control valve Pt, electromagnetic flow control valve Ft, check valve Ct, and sensor Pt. A drop in a pressure supplied to the compressing device 30 or 40 upon a low rotation speed of an engine E can be controlled in such a manner as to keep the pressure high by a motor M controlled by a pressure switch Psw, an accumulator A and relief valve R, which improves controllability. In the present embodiment, a cylinder 16 and piston plunger 17 correspond to the sliding device 13. An working oil 15 corresponds to the pressing device 15. The flow control valves Fr, Ft and the directional control valves Pr, Pt correspond to the operating device. The check valves Cr, Ct and the control valves Pr, Pt and Fr, Ft correspond to the self-lock mechanism. Finally, a pump P0 and the directional control valves Pr, Pt correspond to the driving source. Control instructions Sr and St; switching instructions Cr and Ct are supplied to the valves Fr and Ft; Pr and Pt, respectively, from an electronic control unit 90 for each pulley. The configuration thereof is substantially similar to that shown in FIG. 4 and the duplicated description thereof is omitted. The operation of this embodiment is identical to that of the embodiment shown in FIG. 10B. The hydraulic cylinder is a pressure feedback type control element, which is capable of controlling the switching between the operational functions of the pulleys on the basis of pressure. Accordingly, the switching between the forward and reverse modes can be executed simply and quickly as compared with the screw-pressurization provided by the positioning element.

While, in the foregoing embodiments, the control of the pressing force and elastic force applied to the primary and secondary pulleys is carried out using the screw mechanism and the hydraulic mechanism, pressing methods of other types may be employed. Additionally, a double acting cylinder may be used in stead of the single acting cylinder described in the above embodiment in which the hydraulic system is employed. Two cylinders may be combined for each pulley so that the functions may be divided into for the rotation speed and torque as the example described with reference to FIG. 2. Further, in the foregoing embodiment, while the pressure application devices 10' and 20 each have two driving sources, a configuration may be employed in which one of the pressure application devices uses the compound compressing device and the other uses an single compressing device. Both the compressing devices press in series the elastic body and the engagement device disposed in parallel, thereby switching between the reference pulley function and the following pulley function.

Incidentally, the reason for applying the follower function to one of the primary and secondary pulleys is to absorb or settle, by the elastic force, the causes of errors, fluctuations or the like, such as interference that occurs inside or outside and wear of the transmission member. Accordingly, each instruction should be selected so that there is not a period of time only the pressing force are simultaneously applied to both the pulleys even if the elastic force are simultaneously applied to both the pulleys.

Accordingly, various changes and modifications within the scope capable of easily created by those skilled in the art from claims are included in the present invention.

The present invention has great value in that (1) a pressing force and/or an elastic force are individually applied to a movable disk of a pulley, (2) each amount of the pressing force and the elastic force to be applied can be regulated to an arbitrary amount externally, a rotation speed changing function and a torque changing function can be individually controlled arbitrarily and externally. Consequently, since transmitting ability and efficiency can be freely regulated in an arbitrary range of a speed ratio, high efficiency and stable transmission can be realized under any condition irrespective of a type of belts or an aging change of a transmitting member.

Existing transmissions are difficult to perform compensation for high efficiency since a pressing force is applied to only one of pulleys and an elastic force is applied to only the other. On the other hand, it is possible for a transmission according to the present invention to individually regulate a rotation speed control element and a torque control element basically provided for each of two pulley with high accuracy, and resulting in possible compensation for the high transmission efficiency. This overcomes disadvantage of difficulty in the compensation to expand a changeable speed range naturally, which realizes power transmission in a wide range. Thus, the present invention is applicable to not only vehicles but other technical fields, which means great industrial value.

More specifically, firstly, a compound compressing device is originally mounted to individually apply the pressing force and the elastic force to the movable disk, whereby function switching instructions can be supplied to instruction supply paths for the pressing force and the elastic force. This enables primary functions, a reference pulley function and a follower pulley function to be switched or selected for a single pulley responsive to an arbitrary external instruction. By switching between the reference pulley function and the follower pulley function for two pulleys synchronously, a forward mode operation and a reverse mode operation can be selected for the transmission at the time of an arbitrary speed ratio, which dramatically enhances the transmission efficiency.

Secondly, although a conventional reference pulley function using a pressing force displaces a belt when an instruction is issued, after the instruction is stopped, the function operates to only form a V-groove and has no torque control function positively using a frictional force. On the other hand, in the present invention, a semi-elastic force produced from suppressed elastic vibration is applied to a pulley acting as a reference pulley, which eliminates the cause of irregular power transmission.

Thirdly, for a conventional follower pulley function, the elastic force is applied to the pulley without discrimination between speed-change displacement of the movable disk and compressive displacement of the elastic body. On the other hand, in the present invention, in order to perform the function switching at an arbitrary speed ratio, a pressing end that receives the pressing force can be controlled in parallel with the speed-change displacement of the movable disk at a predetermined interval. This allows a high-speed switching between the functions.

What is claimed:

1. A variable-speed control system for a transmission comprising an input primary pulley and an output secondary pulley composed of variable pitch pulleys, and an endless belt movably wound around said input primary and said output secondary pulleys, said variable-speed control system comprising;

an input side and an output side pressure application device having a pressing force supply path that gives one pulley of said input primary and said output secondary pulleys a reference function by applying a pressing force, and an elastic force supply path that gives the other pulley a follower function by applying an elastic force;

an input elastic device and an output elastic device applying to said input primary and said output secondary pulleys the respective elastic force generated by being variably press-controlled in series via said input side and said output side pressure application devices, respectively;

an input or an output compound compressing device including two compressing devices connected with a semi-elastic force supply path to said pressing force supply path, so as to regulate a frictional pressure applied to said one pulley continuously after instructions has been stopped, with the use of a semi-elastic force that results from the simultaneous supply of the pressing force and the elastic force; and a control device for making axial torque controls of both said input primary and said output secondary pulleys hold a low-speed range and/or a high-speed range into a higher transmitting efficiency, cooperating with the semi-elastic force applied to said one pulley and the elastic force applied to said the other pulley.

2. The variable-speed control system for said transmission according to claim 1, wherein said control device controls an amount of the semi-elastic force applied to said one pulley within such a range as not to change the radius of said belt predetermined by the supplied pressing force.

3. The variable-speed control system for said transmission according to claim 1, wherein, in each said compound compressing device, said semi-elastic force supply path and said pressing force supply path are disposed in parallel to a movable disk of said one pulley including said movable disk and a fixed disk.

4. The variable-speed control system for said transmission according to claim 3, wherein each said compound compressing device includes a superposing pressing end that receives the amount of displacement caused by both a primary compressing device and a secondary compressing device responsive to two instructions, and an individual pressing end that receives the amount of non-superposed displacement caused by either said primary compressing device or said secondary compressing device, or two individual pressing ends that receive the amounts of displacement caused by said primary compressing device and said secondary compressing device, respectively.

5. The variable-speed control system for said transmission according to claim 4, wherein said control device adds the amount of speed-change displacement to the amount of compressive displacement or subtracts the amount of speed-change displacement from the amount of compressive displacement, and said input or output compound compressing device gives the resulting amount to said superposing pressing end.

6. The variable-speed control system for said transmission according to claim 3, wherein, in each said compound compressing device, one of said two sliding devices displaces the other and, one of said two sliding devices has an individual pressing end and the other sliding device has a superposing pressing end.

7. The variable-speed control system for said transmission according to claim 6, wherein each said compound compressing device supplies said pressing force via said individual pressing end and said elastic force via said superposing pressing end to said movable disk, so that said control device can regulate individually the amount of speed-change displacement of said movable disk and the amount of compressive displacement of said elastic device.

8. The variable-speed control system for said transmission according to claim 3, wherein each said compound pressing device supplies said each of a primary instruction and a secondary instruction to at least two of said three sliding members composed of a shared sliding member and the other two sliding members in said two sliding devices.

9. The variable-speed control system for said transmission according to claim 1, wherein, in each said compound compressing device, each of said two compressing devices has an operating device and a sliding device that has two sliding members and a pressing device, in which said sliding device and /or said operating device are/is given a self-locking function.

10. The variable-speed control system for said transmission according to claim 9, wherein, in each said compound compressing device, said sliding device is formed of a ball-screw operated by a worm transmission, or a hydraulic cylinder operated by a hydraulic valve.

11. The variable-speed control system for said transmission according to claim 1, wherein said control device detects and controls the pressing force, the elastic force or the semi-elastic force, using a pressure sensor disposed between said input or output compound compressing device and a main body of said transmission.

12. The variable-speed control system for said transmission according to claim 1, wherein each said compound compressing device is applied to at least either said input side pressure application device when said belt is said press-type, or said output side pressure application device when said belt is said pull-type, alternatively selected by means of a change of power supply paths between said input primary pulley and said output secondary pulley that act as a pair of a reference pulley function and a follower pulley function.

13. The variable-speed control system for said transmission according to claim 1, wherein said variable-speed control system for said transmission is applied to a variable speed control apparatus of a constant power transmission type continuously variable transmission for a vehicle.

14. A variable-speed control system for a transmission comprising an input shaft, an output shaft, a variable pitch input primary pulley mounted on said input shaft, a variable pitch output secondary pulley mounted on said output shaft, and an endless belt wound around said input primary and said output secondary pulleys, said variable-speed control system comprising:

an input side pressure application device including;

an input compound compressing device having pressing ends that receive pressure from an input primary compressing device and an input secondary compressing device connected with two input driving sources;

an input pressing force supply path in which one of the pressing ends presses an input engagement device responsive to a supplied instruction; and an input elastic force supply path disposed in parallel with a pressing force, in which the other pressing end presses in series an input elastic device responsive to a supplied instruction;

an output side pressure application device including;

an output compound compressing device having pressing ends that receive pressure from an output primary compressing device and an output secondary compressing device connected with two output driving sources;

an output pressing force supply path in which one of the pressing ends presses an output engagement device responsive to a supplied instruction; and an output elastic force supply path disposed in parallel with a pressing force, in which the other pressing end presses in series an output elastic device responsive to a supplied instruction;

transmission mode selection means for alternatively switching between a forward mode transmission in which said input side pressure application device performs a reference pulley function while said output side pressure application device performs a follower pulley function, and a reverse mode transmission in which said input side pressure application device performs the follower pulley function while said output side pressure application device performs the reference pulley function; and a control device for supplying via both said two driving sources a rotation speed/torque regulating instruction to each said input side and said output side pressure application devices and said forward/reverse mode transmission switching instruction to said transmission mode selection means, so as to perform a higher transmission efficiency in a variable speed range using both axial torque controls of said input primary and said output secondary pulleys by way of the additional application of a controlled semi-elastic force, and the expansion of a transmittable speed ratio range width using a forward/reverse mode transmission switching operation.

15. The variable-speed control system for said transmission according to claim 14, wherein said transmission mode selection means has said pressing force supply path, said elastic force supply path and said driving sources connected thereof, used in common and applied said forward/reverse mode transmission switching instruction to said driving sources as well as said rotation speed/torque regulating instruction.

16. The variable-speed control system for said transmission according to claim 14, wherein said control device compensates lowering of transmission efficiency occurring in a low-speed range and/or a high-speed range while said forward mode transmission or said reverse mode transmission is performed, by the additional use of a controlled semi-elastic force.

17. The variable-speed control system for said transmission according to claim 14, wherein said control device makes said input side pressure application device interrupt or supply the pressing force to said input primary pulley, synchronizing with said output side pressure application device when said output side pressure application device supplies or interrupts the pressing force to said output secondary pulley, respectively.

18. The variable-speed control system for said transmission according to claim 14, wherein said control device regulates a gap between two sliders of said input or said output engagement device so that said gap is constant by means of a superposing pressing end or an individual pressing end upon the disengaging operation of said input or said output engagement device.

19. The variable-speed control system for said transmission according to claim 14, wherein said input side pressure application device applies the semi-elastic force or the elastic force to said input primary pulley, synchronizing with said output side pressure application device when said output side pressure application device applies the elastic force or a semi-elastic force to said output secondary pulley respectively.

20. The variable-speed control system for said transmission according to claim 14, wherein said control device controls a friction force applied to said output second pulley in proportion or inverse proportion to the rotation speed of said output secondary pulley by the use of regulation of the elastic force and the semi-elastic force.

21. A variable-speed control system for a transmission comprising a variable pitch first pulley including one or two movable disk(s), a variable pitch second pulley including one or two movable disk(s), and an endless belt wound around said first and said second pulleys, said variable-speed control system comprising:

a first and a second pressure application device each having a compressing device supplying at least a pressing force or an elastic force to said movable disk of a corresponding pulley, in which said first pressure application device has a pressing force supply path led to said movable disk of said first pulley and said second pressure application device has an elastic force supply path led to said movable disk of said second pulley;

a switching device for switching respective to a switching instruction between a forward mode transmission in which said first pulley as an input primary pulley of said transmission performs a reference function while said second pulley as an output secondary pulley of said transmission performs a follower function, and a reverse mode transmission in which said second pulley as said input primary pulley of said transmission performs the follower function while said first pulley as said output secondary pulley of said transmission performs the reference function;

at least a first or a second elastic device connected in series with said elastic force supply path of said first or said second pressure application device to apply the elastic force to at least said first or said second pulley, respectively; and a control device for giving said first and said second pressure application devices a function of individually regulating the pressing force and the elastic force, and said switching device a function of transmission mode switching between roles of the reference function and the follower function, in order to enlarge a transmittable speed ratio range of said transmission.

22. The variable-speed control system for said transmission according to claim 21, wherein said control device provides said regulating instructions and said switching instruction as electric signals to be converted to mechanical signals by said driving sources and said switching device.

23. The variable-speed control system for said transmission according to claim 21, wherein said switching device changeably gives said transmission said forward mode transmission or said reverse mode transmission in accordance with the switching operation of pulley role functions for said first and said second pressure application devices.

24. The variable-speed control system for said transmission according to claim 23, wherein said switching device has a first and a second engagement device each connected in series to said pressing force supply path in each said first and said second pressure application devices.

25. The variable-speed control system for said transmission according to claim 24, wherein said control device supplies the switching instructions to both said pressure application devices, so that the pressure application is performed on one of the pressing force supply paths while the pressure removal is performed on the other pressing force supply path.

26. The variable-speed control system for said transmission according to claim 21, wherein said control device has rotation speed sensors for said first pulley and said second pulley, and switches between the transmission mode operations at an arbitrary speed ratio or at an output side rotation speed based on a radius of said belt.

27. The variable-speed control system for said transmission according to claim 21, wherein said switching device changeably gives said transmission said forward mode transmission or said reverse mode transmission in accordance with the switching operation of power supply paths to said first and said second pulleys.

28. The variable-speed control system for said transmission according to claim 21, wherein both said pressure application devices perform the forward mode operation in a large speed ratio range and the reverse mode operation in a smaller speed ratio range when said belt is of a press-type, and perform the reverse mode operation in a large speed ratio range and the forward mode operation in a smaller speed ratio range when said belt is of a pull-type.

29. The variable-speed control system for said transmission according to claim 21, wherein said variable-speed control system for said transmission is applied to a variable speed control apparatus of a constant power transmission type continuously variable transmission for a vehicle.

30. A variable-speed control system for a transmission comprising an input shaft, an output shaft, a variable pitch input primary pulley including one or two movable disk(s), a variable pitch output secondary pulley including one or two movable disk(s), and an endless belt wound around said input primary and said output secondary pulleys, said variable-speed control system comprising:

a first pressure application device including a first input side and a first output side pressure application device each having a compressing device supplying at least a pressing force or an elastic force to said movable disk, in which said first input side pressure application device forms a pressing force supply path directly led to said movable disk of said input primary pulley while said first output side pressure application device forms an elastic force supply path indirectly via a first elastic device compressed in series led to said movable disk of said output secondary pulley, so as to provide a forward mode operation to said transmission;

a second pressure application device including a second input side and a second output side pressure application device each having a compressing device supplying at least a pressing force or an elastic force to said movable disk, in which said second input side pressure application device forms an elastic force supply path indirectly via a second elastic device compressed in series led to said movable disk of said input primary pulley while said second output side pressure application device forms a pressing force supply path directly led to said movable disk of said output secondary pulley, so as to provide a reverse mode operation to said transmission;

a switching device for changeably selecting one of said forward and said reverse mode operations to perform higher transmission efficiency than the other, and to transmit power between said input shaft and said output shaft of said transmission responsive to a switching instruction; and a control device for supplying regulating instructions to said first and second pressure application devices and said switching instruction to said switching device, and widely extending a transmittable speed ratio range for said transmission.

31. The variable-speed control system for said transmission according to claim 30, wherein said first and said second pressure application devices are a singly shared pressure application device, in which said input side and said output side pressure application devices can changeably give said forward mode operation or said reverse mode operation respective to said switching instructions.

32. The variable-speed control system for said transmission according to claim 30, wherein each of said first and said second pressure application devices includes a compound compressing device formed of a ball-screw operated by a worm transmission, or a hydraulic cylinder operated by a hydraulic valve.

33. The variable-speed control system for said transmission according to claim 32, wherein in said first and said second pressure application devices, said compound compressing device includes a superposing pressing end that receives the amount of displacement caused by both a primary compressing device and a secondary compressing device responsive to two instructions, and an individual pressing end that receives the amount of non-superposed displacement caused by either said primary compressing device or said secondary compressing device, or two individual pressing ends that receive the amounts of displacement caused by said primary compressing device and said secondary compressing device, respectively.

34. The variable-speed control system for said transmission according to claim 33, wherein said first and said second pressure application devices synchronously or asynchronously regulate a speed ratio using said individual pressing ends and torque using said superposing pressing ends.

35. The variable-speed control system for said transmission according to claim 30, wherein said control device regulates axial torque of said input primary and said output secondary pulleys applied said elastic force and said semi-elastic force during at least said forward mode operation or said reverse mode operation.

36. The variable-speed control system for said transmission according to claim 30, wherein, in at least said first or said second pressure application devices, each of said input side and said output side pressure application devices is disposed said elastic device to a side of said movable disk and said compressing devices to a side of a body of said transmission.

37. The variable-speed control system for said transmission according to claim 30, wherein said switching device switches at an intermediate speed ratio point of an entire transmittable speed ratio range, resulting to maintain higher transmitting efficiency in a widened speed ratio range.

38. The variable-speed control system for said transmission according to claim 37, wherein said switching device is transmission mode selection means for operating in a manner that said forward mode transmission continues to perform a torque/speed ratio control while said reverse mode transmission keeps on stopping, and said reverse mode transmission continues to perform the torque/speed ratio control while said forward mode transmission keeps on stopping.

39. The variable-speed control system for a transmission comprising a first transmission device and a second transmission device each including an input primary pulley and an output secondary pulley composed of variable pitch pulleys having at least one or two movable disk(s), and one or two endless belt(s), said variable-speed control system comprising;

a first input side and output side pressure application device for variably speed/torque controlling said first transmission device, and giving one of said first input primary and said first output secondary pulleys a reference function by applying a pressing force and the other a follower function by applying an elastic force;

said first transmission device performing higher transmitting efficiency in a first speed ratio range of an entire speed ratio range than said second transmission device;

a second input side and output side pressure application device for variably speed/torque controlling said second transmission device, and giving one of second input primary and second input secondary pulleys a reference function by applying a pressing force and the other a follower function by applying an elastic force;

said second transmission device performing higher transmitting efficiency in a second speed ratio range of an entire speed ratio range than said first transmission device;

a switching device changeably selecting, alternatively, said first transmission device or said second transmission device, responsive to a switching instruction; and a control device capable of enlarging an entire transmittable range of high transmission efficiency into more widened range in combination with said first speed ratio range in said first transmission device and said second speed ratio range in said second transmission device by way of supplying said switching instruction.

40. The variable-speed control system for said transmission according to claim 39, wherein in said first and said second transmission devices, said input primary pulleys and said output secondary pulleys are a single input pulley and a single output pulley, respectively.

41. The variable-speed control system for said transmission according to claim 39, wherein said first and said second input and output side pressure application devices are comprised of a single input pressure application device and a single output pressure application device.

* * * * *